(12) United States Patent
Waugh et al.

(10) Patent No.: US 11,784,941 B2
(45) Date of Patent: Oct. 10, 2023

(54) APPARATUS AND METHOD FOR OPERATING A RING INTERCONNECT

(71) Applicant: Arm Limited, Cambridge (GB)

(72) Inventors: Alex James Waugh, Cambridge (GB); Andrew John Turner, Cambridge (GB); Shobhit Singhal, Bangalore (IN)

(73) Assignee: Arm Limited, Cambridge (GB)

( * ) Notice: Subject to any disclaimer, the term of this patent is extended or adjusted under 35 U.S.C. 154(b) by 130 days.

(21) Appl. No.: 17/374,142

(22) Filed: Jul. 13, 2021

(65) Prior Publication Data
US 2023/0021078 A1    Jan. 19, 2023

(51) Int. Cl.
| H04L 47/762 | (2022.01) |
| H04L 47/78 | (2022.01) |
| H04L 12/42 | (2006.01) |
| H04L 47/122 | (2022.01) |

(52) U.S. Cl.
CPC ............ *H04L 47/762* (2013.01); *H04L 12/42* (2013.01); *H04L 47/122* (2013.01); *H04L 47/781* (2013.01); *H04L 2012/421* (2013.01)

(58) Field of Classification Search
None
See application file for complete search history.

(56) References Cited

U.S. PATENT DOCUMENTS

2014/0092732 A1*  4/2014  Mejia ................. G06F 15/7825
370/230

* cited by examiner

*Primary Examiner* — Jason E Mattis
*Assistant Examiner* — Bao G Nguyen
(74) *Attorney, Agent, or Firm* — NIXON & VANDERHYE P.C.

(57) ABSTRACT

An apparatus and method for operating a ring interconnect are disclosed. The ring interconnect has a plurality of nodes that are used to connect to associated components, and is arranged to transport a plurality of slots around the ring interconnect between the nodes in order to transfer items of traffic allocated into those slots between components connected to the nodes. For each item of traffic, one of the components acts as a source to allocate that item of traffic into a slot, and another components acts as destination to seek to remove that item of traffic from the slot. In a default mode of operation, the ring interconnect is arranged to allow all of the slots to be available for transfer of any items of traffic. Special slot management circuitry is provided that is responsive to a throughput alert trigger indicating a potential for occurrence of a throughput inhibiting condition, to cause a slot amongst the plurality of slots to be reserved as a special slot that is constrained for use only when one or more determined conditions are met. Further, the one or more determined conditions are arranged to cause the special slot to be used in a manner that seeks to avoid the throughput inhibiting condition arising.

23 Claims, 10 Drawing Sheets

APPARATUS AND METHOD FOR OPERATING A RING INTERCONNECT

BACKGROUND

The present technique relates to an apparatus and method for operating a ring interconnect.

A ring interconnect is a type of interconnect that can be used to transport traffic between components connected to nodes of the ring interconnect. In particular, the ring interconnect can be arranged to transport slots around the ring interconnect between the nodes in order to transfer items of traffic allocated into those slots between components connected to the nodes.

In a system employing a ring interconnect, there is the potential for certain throughput impacting events to arise. By way of example, such a ring interconnect is typically non-stalling, and therefore traffic already present on the ring has priority over traffic trying to ingress onto the ring, and this can give rise to a denial of service (DoS) condition arising in respect of one or more components connected to the ring interconnect. Further, certain components connected to the ring may have the potential to enter a state where they can no longer accept further items of traffic from the ring interconnect, at least for certain periods of time, and this can lead to deadlock situations arising, for example where the slots on the ring are full of traffic destined for such a component.

It would be desirable to provide a simple and effective mechanism for seeking to avoid such throughput impacting events arising.

SUMMARY

In one example arrangement, there is provided an apparatus comprising: a ring interconnect; a plurality of nodes provided within the ring interconnect to connect to associated components; wherein: the ring interconnect is arranged to transport a plurality of slots around the ring interconnect between the nodes in order to transfer items of traffic allocated into those slots between components connected to the nodes, wherein for each item of traffic one of the components acts as a source to allocate that item of traffic into one of the slots via the source's associated node, and another component acts as a destination to seek to remove that item of traffic from the ring interconnect when the slot allocated for that item of traffic is received at the destination's associated node; the ring interconnect is arranged in a default mode to allow all of the slots to be available for transfer of any items of traffic; and the apparatus further comprises special slot management circuitry that is responsive to a throughput alert trigger indicating a potential for occurrence of a throughput inhibiting condition, to cause a slot amongst the plurality of slots to be reserved as a special slot that is constrained for use only when one or more determined conditions are met, wherein the one or more determined conditions are arranged to cause the special slot to be used in a manner that seeks to avoid the throughput inhibiting condition arising.

In another example arrangement, there is provided a method of operating a ring interconnect, comprising: providing a plurality of nodes within the ring interconnect to connect to associated components; transporting a plurality of slots around the ring interconnect between the nodes in order to transfer items of traffic allocated into those slots between components connected to the nodes, wherein for each item of traffic one of the components acts as a source to allocate that item of traffic into one of the slots via the source's associated node, and another component acts as a destination to seek to remove that item of traffic from the ring interconnect when the slot allocated for that item of traffic is received at the destination's associated node; operating the ring interconnect, when in a default mode, to allow all of the slots to be available for transfer of any items of traffic; and in response to a throughput alert trigger indicating a potential for occurrence of a throughput inhibiting condition, causing a slot amongst the plurality of slots to be reserved as a special slot that is constrained for use only when one or more determined conditions are met, wherein the one or more determined conditions are arranged to cause the special slot to be used in a manner that seeks to avoid the throughput inhibiting condition arising.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
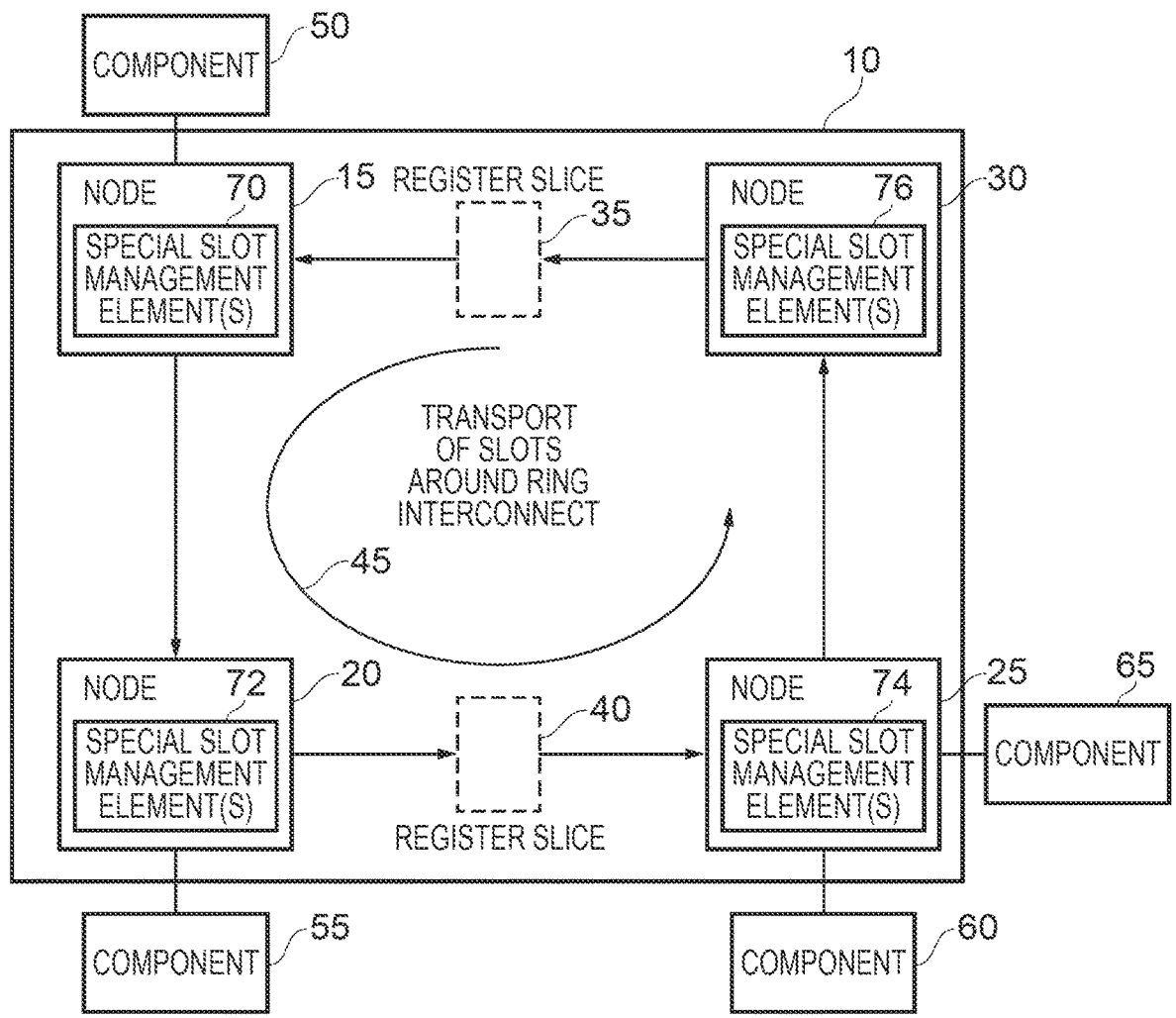
FIG. 1 is a block diagram illustrating a ring interconnect in accordance with one example implementation.

Known techniques for seeking to avoid denial of service or deadlock situations within ring interconnects can be inefficient and/or complex. For example, slots could be statically reserved for certain sources or for certain traffic classes, but such static partitioning can waste considerable bandwidth when not all sources or traffic classes are active. As another example, end-to-end crediting could be employed, where space is reserved in a buffer at the destination, and a source is only allowed to send the traffic if it acquires a credit for the destination buffer. However, such an approach can result in very large buffers to cover the latency of all outstanding transactions, especially when there are multiple sources and multiple destinations. As another alternative mechanism, retry mechanisms could be employed, where if a destination cannot accept an item of traffic, it sends a retry response, causing the source to resend the transaction later when there is space available in the destination. However, such an approach can add significant complexity and area to a design, and can give rise to non-linear performance effects.

The techniques described herein aim to seek to avoid throughput inhibiting conditions arising, in a manner that does not suffer from the inefficiencies and/or complexities of known techniques.

In accordance with the techniques described herein, an apparatus is provided that has a ring interconnect, and a plurality of nodes provided within the ring interconnect to connect to associated components. The nodes can be configured in a variety of ways, and hence for example may be arranged to only allow a single component to be connected to each node, or alternatively one or more of the nodes may be arranged to be connected to more than one component.

The ring interconnect is arranged to transport a plurality of slots around the ring interconnect between the nodes in order to transfer items of traffic allocated into those slots between components connected to the nodes. For each item of traffic one of the components acts as a source to allocate that item of traffic into one of the slots via the source's associated node, and another component acts as a destination to seek to remove that item of traffic from the ring interconnect when the slot allocated for that item of traffic is received at the destination's associated node. If for any reason the destination cannot receive the item of traffic at the time the slot allocated for that item of traffic is received at the destination's associated node, then the slot can merely continue around the ring for one or more re-spin cycles, until it is again received at the destination's associated node at a point in time where the destination can receive it.

In accordance with the techniques described herein the ring interconnect is arranged in a default mode of operation to allow all of the slots to be available for transfer of any items of traffic. This hence retains maximum flexibility for the transport of traffic around the ring. However, the apparatus further comprises special slot management circuitry that is responsive to a throughput alert trigger indicating a potential for occurrence of a throughput inhibiting condition, to cause a slot amongst the plurality of slots to be reserved as a special slot that is constrained for use only when one or more determined conditions are met. The one or more determined conditions are arranged to cause the special slot to be used in a manner that seeks to avoid the throughput inhibiting condition.

Hence, in accordance with the techniques described herein, in normal use all of the slots are freely available for transfer of any items of traffic, but when the special slot management circuitry detects the potential for a throughput inhibiting condition to occur, one of the slots becomes the special slot whose use is constrained, and by constraining the use of that special slot at that time this can avoid the throughput inhibiting condition arising.

Further, when in due course it is determined that the potential for occurrence of the throughput inhibiting condition is no longer present, then ring interconnect can return to operation in the default mode, thereby at that point again allowing any of the slots to be used for any items of traffic. Such an approach has been found to provide a particularly simple and efficient mechanism for seeking to avoid throughput inhibiting conditions arising during the operation of a ring interconnect.

There are a number of ways in which the one or more determined conditions constraining use of the special slot can be managed and made available to any entities within the apparatus that need to assess those determined conditions. However, in one example implementation the ring interconnect is arranged to transport the special slot around the ring interconnect with associated metadata, and the special slot management circuitry is arranged to control the associated metadata so as to enable the one or more determined conditions constraining use of that special slot to be determined from the associated metadata. Hence, in such an implementation the special slot management circuitry can control and maintain the associated metadata for the special slot so as to enable the one or more determined conditions constraining its use to be tailored to the particular situation at hand, and then entities seeking to make use of the special slot can assess the associated metadata in order to determine the conditions that constrain its use, and hence determine whether they are able to make use of the special slot or not.

In one example implementation, the special slot management circuitry is arranged to implement an arbitration mechanism to arbitrate access to the special slot. In particular, the arbitration of access to the special slot is achieved in one example implementation partly as a result of how the special slot management circuitry controls the metadata, and partly by the round robin nature that results from the slots passing in turn around the nodes of the ring interconnect.

The special slot management circuitry can take a variety of forms. For example, it could in certain implementations be a centralised entity that controls the use of the special slot and the maintenance of the associated metadata. However, in one example implementation the special slot management circuitry is implemented in a distributed manner, and in particular is implemented by a plurality of distributed special slot management elements, where each distributed special slot management element is provided in association with one of the nodes. In some example implementations, the distributed special slot management elements may be provided within the nodes, and for each node any distributed special slot management element in that node may be associated with one or more components connected to that node. However, it is also possible in some implementations for one or more of the distributed special slot management elements to be provided within the components themselves.

Whilst the choice of the slot to be used as the special slot may vary dependent on implementation, in one example implementation the special slot is a predetermined slot amongst the plurality of slots. This provides a particularly simple and effective implementation, since once use of the special slot is activated, each node knows the location of that special slot relative to the other slots being transported around the ring, and hence knows when it will receive that special slot.

The throughput inhibiting condition that is seeking to be avoided through use of the techniques described herein can take a variety of forms, but in one example implementation comprises a denial of service condition and/or a deadlock condition. In one example implementation where the throughput inhibiting condition comprises a deadlock condition, the ring interconnect may be arranged to transfer items of traffic of multiple traffic classes between the components connected to its nodes, where the multiple traffic classes comprise at least blockable traffic and non-blockable traffic. Blockable traffic is traffic whose destination is a blockable component that is able to cause the deadlock condition by virtue of being able to enter a state where that blockable component is unable to accept from the ring interconnect any item of traffic in a situation where each of the slots has been allocated an item of traffic for that blockable component.

In such an implementation, the throughput alert trigger can take the form of a deadlock alert trigger raised in association with a given blockable component to indicate a potential for occurrence of the deadlock condition for that given blockable component. The special slot management circuitry can then be arranged, in response to the deadlock alert trigger, to ensure that the special slot is reserved for use to transfer items of traffic that are destined for a component other than the given blockable component. This hence ensures that, before the deadlock condition can occur, the special slot is reserved for use for traffic that is not destined for the given blockable component, and hence can be used for other traffic. This can hence ensure that the deadlock condition does not in fact occur.

In one example implementation, the blockable traffic comprises a plurality of sub-classes of blockable traffic, where each sub-class of blockable traffic is associated with a component type. The ring interconnect is then arranged to transport the special slot around the ring interconnect with associated metadata, where the associated metadata comprises a flag for each sub-class of blockable traffic. The earlier-mentioned given blockable component will have an associated given component type, and the special slot management circuitry can be arranged, in response to the deadlock alert trigger being raised for the given blockable component, to set the flag for the sub-class of blockable traffic associated with the given component type so as to prevent the special slot from being used for items of traffic destined for components of the given component type. This ensures that in that situation the special slot is reserved for use for items of traffic destined for components of a type other than the type that has been detected as having the potential for later occurrence of a deadlock condition.

In such an implementation, the special slot management circuitry may comprise a reserved buffer entry associated with each blockable component that is arranged to only be used to accept an item of traffic from the special slot. This reserved buffer entry can take a variety of forms. For example, it could be an extra entry in an existing FIFO (first-in-first-out) structure provided in association with each blockable component. In such an implementation, the FIFO structure may be within the blockable component itself, or within the node to which that blockable component is connected. Alternatively, the reserved buffer entry could be separate to any such destination FIFO associated with the blockable component, and hence could be either in the destination or the associated node, irrespective of the location of the destination FIFO for the blockable component.

When using such a reserved buffer entry, the special slot management circuitry may be arranged, on detecting, whilst the ring interconnect is in the default mode, that the given blockable component is in a state that would prevent acceptance of further items of traffic, to cause the reserved buffer entry to be employed to receive a further item of traffic destined for that given blockable component provided that item of traffic is within the special slot. The special slot management circuitry may then be further arranged, in response to the further item of traffic being received into the reserved buffer entry, to set the flag for the sub-class of blockable traffic associated with the given component type. Hence, by such an approach, population of the reserved buffer entry can be used to trigger setting of the flag for the sub-class of blockable traffic associated with the given component type, to prevent further use of the special slot by traffic destined for a component of that given component type, and therefore removing the potential for the deadlock condition arising by ensuring that the special slot is now reserved for use in association with other traffic.

There are a number of ways in which the special slot management circuitry can detect that the given blockable component is in a state that would prevent acceptance of further items of traffic. However, in one example implementation, the reserved buffer entry forms a final entry in a buffer storage associated with each blockable component, where the buffer storage is used to buffer items of traffic received from the ring interconnect for that blockable component, and the special slot management circuitry is arranged to detect that the given blockable component is in a state that would prevent acceptance of further items of traffic when all entries in the buffer storage other than the final entry are full.

In one example implementation, the apparatus further comprises egress management circuitry associated with each component connected to the ring interconnect that is able to act as a destination for an item of traffic. Such egress management circuitry can in one example implementation be provided within the node associated with the destination, but could alternatively in another example implementation be included within the destination component. The egress management circuitry can be arranged to be responsive to detecting a potential egress denial of service condition for the associated component, to determine a snapshot identifying those slots within the plurality of slots currently containing an item of traffic destined for the associated component, and then to only allow an item of traffic to be received from the ring interconnect for the associated component when that item of traffic is either within one of the slots identified in the snapshot or is within the special slot, until each item of traffic identified by the snapshot has been received. Hence, once the snapshot has been taken, then this constrains which slots the associated destination can receive traffic from, until the traffic in all of the slots identified by the snapshot has been received. It should be noted that, in accordance with techniques described herein, the egress management circuitry does not simply constrain the associated destination to only receive traffic from the slots identified within the snapshot, but also allows traffic to be received from the special slot, in situations where use of the special slot has been activated.

In one such example implementation, when an item of traffic is received for the associated component from the special slot at a time where at least one item of traffic is still identified by the snapshot, the egress management circuitry is arranged to cause the special slot management circuitry to set the flag for the sub-class of blockable traffic associated with the component type of the associated component, and to only allow the special slot management circuitry to clear that flag once each item of traffic identified by the snapshot has been received. It should be noted that in this instance the flag for the sub-class of blockable traffic is set even if the earlier-mentioned reserved buffer entry has not been utilised, and further that flag will only be cleared once the destination has received traffic from all of the slots identified in the snapshot. Such an approach ensures that the special slot is not reused for the same type of traffic until all existing slots in the snapshot have had their traffic removed. By taking such an approach, this ensures that the special slot cannot be used to seek to introduce traffic that repeatedly overtakes the traffic in the slots identified when the snapshot was taken, and thus prevents an egress denial of service condition arising not only during the normal use case, but also when the special slot is being used.

The blockable components that can give rise to the deadlock condition can take a variety of forms. However, in one example implementation the ring interconnect is arranged to be coupled to additional interconnect circuitry via at least one master port component connected to a node of the ring interconnect. Each master port component is a blockable component, and is able to cause the deadlock condition due to a dependency imposed by the additional interconnect circuitry between items of traffic received by the additional interconnect circuitry from the master port component and items of traffic passed to the master port component by the additional interconnect circuitry for transferring via the ring interconnect.

For example, the additional interconnect circuitry may operate in accordance with a protocol that requires that the master port can accept all read data that that master port has requested, and if it does not accept all read data then that additional interconnect circuitry may be allowed to delay accepting write data issued from that master port to the additional interconnect circuitry. It will be appreciated that if the ring interconnect is full of write data destined for such a master port, then there is no room for the ring interconnect to accept any read data from the master port. As a result, the master port will not be able to conform to the additional interconnect circuitry's requirement for it to be able to accept all read data it has requested, which in turn means that the additional interconnect circuitry may refuse to accept write traffic, preventing the master port from draining the write traffic from the ring, thereby leading to the deadlock condition.

Another situation where one or more blockable components may be provided occurs when the ring interconnect is coupled to a further ring interconnect. In particular, in one example implementation the apparatus may further comprise a further ring interconnect that is provided with a plurality of further nodes to connect to associated components, and which is arranged to transport a plurality of slots around the further ring interconnect between the further nodes in order to transfer items of traffic allocated into those slots between components connected to the further nodes. In such an implementation, cross-ring coupling circuitry may be used to couple the ring interconnect with the further ring interconnect to allow items of traffic to be passed between the ring interconnect and the further ring interconnect in each direction. In one example implementation, the cross-ring coupling circuitry comprises a first queue structure to buffer items of traffic being passed from the ring interconnect to the further ring interconnect, and a second queue structure to buffer items of traffic being passed from the further ring interconnect to the ring interconnect, each of the first and second queue structures being connected to nodes on both the ring interconnect and the further ring interconnect, and each of the first and second queue structures forming at least one blockable component. In such a situation, the deadlock condition can arise when corresponding blockable components in each of the first and second queue structures are full of blockable traffic and the slots on both the ring interconnect and the further ring interconnect are full of blockable traffic destined for those blockable components.

In such an implementation, it will be appreciated that if the first ring is full of traffic trying to get to the second ring, and the second ring is full of traffic trying to get to the first ring, neither cross-ring queue structure can drain, and this can lead to deadlock. However, through use of the earlier-mentioned technique involving the use of the special slot and the special slot management circuitry, such a deadlock condition can be avoided by reserving the special slot for use for traffic other than the type of traffic that could give rise to the above-mentioned deadlock condition, before the deadlock condition actually occurs.

The first and second queue structures can take a variety of forms, but in some implementations each queue structure may need to handle traffic of more than one class. In such a situation, each queue structure can be viewed as a separate blockable component for each class of traffic that it handles. In some implementations, each queue structure may still be able to be implemented using a single queue, for example where the different traffic classes can be identified independently within the queue entries, and can be added and removed from the queue independently of traffic of the other class. However, alternatively, each queue structure could provide separate queues for each class of traffic handled by it.

In one example implementation, the further ring interconnect can be organised in the same way as the first ring interconnect. Hence, the further ring interconnect may also be arranged in the default mode to allow all of the slots to be available for transfer of any items of traffic. In addition, the special slot management circuitry may be further arranged, in response to the deadlock alert trigger being detected for a blockable component forming a destination for traffic being transferred via the further ring interconnect, to cause a slot amongst the plurality of slots transported around the further ring interconnect to be reserved as a further special slot that is constrained for use only when one or more determined conditions are met. In such an implementation, it will be appreciated that the special slot management circuitry can manage use of the special slot on the first ring interconnect and use of the special slot on the further ring interconnect independently of each other, depending on the throughput inhibiting condition that has been detected as having the potential to arise. Hence, whilst the special slot on the first ring may get reserved if the first ring is unable to send its traffic to the further ring, the further special slot may be independently reserved on the further ring in situations where the further ring is unable to send its traffic to the first ring.

The above implementation employing a ring interconnect and a further ring interconnect can also be extended to accommodate additional ring interconnects. For instance, multiple ring interconnects could be daisy chained together to form a sequence of ring interconnects, for example providing a first ring interconnect that is coupled to a second ring interconnect, that is in turn connected to a third ring interconnect. Each of the ring interconnects can be organised as described above, and each can be arranged to implement special slot management circuitry to enable a special slot on each ring to be reserved as and when required. In such a daisy-chained implementation, when traffic is added into a queue structure to be passed from one ring to the next ring, the queue structure can be arranged to identify the ultimate destination ring for each item of traffic, and can be arranged to treat traffic destined for different rings as being of a different sub-class of traffic. For example, considering traffic that is received into a queue structure from the first ring, and that is destined for either the second ring or the third ring, when that traffic is issued from the queue structure onto the second ring it may be treated as same ring traffic if its destination is on the second ring, or cross-ring traffic if it is destined for the third ring interconnect.

In one example implementation, the ring interconnect may not only be connected to one or more further ring interconnects, but could also be coupled to the earlier-mentioned additional interconnect circuitry via at least one master port component. In such a situation, the blockable traffic may comprise a plurality of sub-classes of blockable traffic, comprising same ring master port traffic destined for a master port component on the same ring as that traffic, cross-ring master port traffic destined for a master port component on a different ring to the ring containing that traffic, and cross-ring other traffic destined for a component other than a master port component on a different ring to the ring containing that traffic. Each of the first and second queue structures may then be arranged to operate, from a viewpoint of both the ring interconnect and the further ring interconnect, as two blockable components to independently handle the transfer of cross-ring master port traffic and cross-ring other traffic.

As mentioned earlier, how a queue structure implements the two blockable components can vary dependent on implementation, for example dependent on the complexity of the queue mechanism used, and its ability to independently add and remove traffic items of different sub-classes. In one particular example implementation, the two blockable components may be formed of a master port traffic queue that forms a blockable component to receive cross-ring master port traffic, and a separate traffic queue forming a blockable component to receive cross-ring other traffic.

As mentioned earlier, the throughput inhibiting condition can take a variety of forms. In one example implementation the throughput inhibiting condition may comprise an ingress denial of service condition. An ingress denial of service condition is a condition that can occur in ring interconnects because traffic already on the ring inherently has higher priority than new traffic trying to ingress onto the ring. As a result, continuous traffic from one node can for example deny a node further around the ring an opportunity to ingress new traffic onto the ring, even if the destination is always accepting the traffic. In accordance with the techniques described herein, to seek to alleviate the prospect of such an ingress denial of service condition arising, the special slot management circuitry may comprise ingress management circuitry provided in association with each node to manage ingress of items of traffic onto the ring interconnect from an associated component. The ingress management circuitry is then responsive to detecting a potential ingress denial of service condition for the associated component, to seek to obtain a right to allocate an item of traffic from the associated component into the special slot. By such an approach, the actual occurrence of an ingress denial of service condition can be avoided.

In one example implementation the ingress management circuitry is provided once per node, independent of whether there are one or more than one components connected to that node. However, in an alternative implementation an ingress management circuit could be provided for each component that can act as a source for traffic to be inserted onto the ring interconnect. This latter implementation may require the use of additional flags, and some arbitration between components on the same node if they both want to obtain the right to allocate an item of traffic into the special slot, but may be considered a desirable implementation mechanism in some situations.

As mentioned earlier, the ring interconnect can be arranged to transport the special slot around the ring interconnect with associated metadata. In implementations including the earlier-mentioned ingress management circuitry, the associated metadata may comprise an ingress ticket, and the ingress management circuitry may be arranged to cause an item of traffic from the associated component to be allocated into the special slot once the ingress management circuitry has acquired the ingress ticket, the ingress management circuitry only being able to acquire the ingress ticket when the ingress ticket is indicated as currently unacquired.

As mentioned earlier, the ring interconnect may be arranged to transfer items of traffic of multiple traffic classes including both blockable traffic and non-blockable traffic. In such implementations, the metadata may comprise at least one upgrade ticket, and when the ingress management circuitry wishes to insert an item of blockable traffic into the special slot, the ingress management circuitry may be required to acquire one of the at least one upgrade tickets to allow the item of blockable traffic to be treated as unblockable before then acquiring the ingress ticket. By use of such a mechanism, it can be ensured that the ingress management circuitry does not seek to send an item of blockable traffic in the special slot until it has been confirmed that that item of traffic cannot in fact be blocked from entering the special slot. In particular, once it has obtained the relevant upgrade ticket for the item of blockable traffic it wishes to send, then this effectively upgrades the blockable traffic to be non-blockable traffic, and only thereafter can the ingress management circuitry acquire the ingress ticket to enable it to use the special slot to transport the required item of traffic that it wishes to send via the special slot.

In one example implementation, the ingress management circuitry is arranged, once the upgrade ticket has been acquired, to wait for any current item of traffic in the special slot to be removed from the special slot before acquiring the ingress ticket. In particular, there is the potential that the removal of that existing content from the special slot could cause the blocked flag to be set, and if that setting of the blocked flag relates to the type of traffic that the ingress management circuitry is seeking to send, then it would be prevented from sending that item of traffic even though it has the upgrade ticket. Accordingly, the ingress management circuitry may be arranged not to attempt to take the ingress ticket until the current item of traffic has been removed from the special slot. In an alternative implementation, as a further optimisation, such a requirement to wait for the current item of traffic in the special slot to be removed may only arise if the current item of traffic in the special slot is of the same traffic class as the one the ingress management circuitry is seeking to send. In particular, it is only in that instance that there is the potential that the removal of that current item of traffic from the special slot could cause the relevant blocked flag to be set that could prevent the ingress management circuitry sending the item of traffic that it wishes to send.

As mentioned earlier, the blockable traffic may comprise a plurality of sub-classes of blockable traffic, and in such instances the metadata may comprise an upgrade ticket for each sub-class of blockable traffic. The ingress management circuitry is then required to acquire the upgrade ticket applicable for the item of blockable traffic seeking to be allocated into the special slot before then acquiring the ingress ticket.

As also mentioned earlier, the associated metadata may comprise a flag for each sub-class of blockable traffic that can be set in response to a deadlock alert trigger being raised. In particular, once the flag has been set for a particular sub-class of blockable traffic, that prevents the special slot from being used for items of traffic of that sub-class of blockable traffic.

In one example implementation, the ingress management is arranged, when the upgrade ticket applicable for the item of blockable traffic seeking to be allocated into the special slot has been acquired, to ensure that the flag for the sub-class of blockable traffic to which that item of blockable traffic belongs is clear before acquiring the ingress ticket.

In one example implementation, the ingress management circuitry is arranged to release the ingress ticket on detecting that the item of traffic that was inserted into the special slot, due to the ingress management circuitry having acquired the ingress ticket, has been removed from the special slot. There are a number of ways in which the ingress management circuitry can detect this condition, for example, it can wait until the special slot returns back to the associated node, having passed through all of the other nodes of the ring interconnect, and if the special slot no longer contains the item of traffic that had been added by the ingress management circuitry, it is then known that the item of traffic has egressed from the ring interconnect, and that it is then able to release the ingress ticket. In another alternative embodiment, it may be allowed for the ingress management circuitry to release the ingress ticket when it has added its item of traffic into the slot, rather than waiting until it has been confirmed that that item of traffic has egressed from the ring. However, whichever approach is taken, the above described technique ensures that the ingress management circuitry, once it has acquired the ingress ticket, uses the special slot once, and then clears the ingress ticket. This ensures that if more than one node wishes to acquire the ingress ticket, then the ticket naturally gets re-allocated on a round robin basis, due to the way in which the slots are transported around the ring.

If the node that has the ingress ticket also has an upgrade ticket, then in one example implementation it releases the upgrade ticket at the same time as releasing the ingress ticket.

Particular examples will now be described with reference to the figures.

FIG. 1 is a block diagram schematically illustrating a ring interconnect in accordance with one example implementation. The ring interconnect 10 has a plurality of nodes 15, 20, 25, 30 that are used to connect to associated components 50, 55, 60, 65. In this example implementation, it is assumed that more than one component may be connected to a single node, as is for example the case for the components 60, 65 connected to the node 25. Further, it should be noted that there is no requirement for every node to have an associated component connected thereto, and hence for example the node 30 may not have any components connected to it.

The ring interconnect 10 is arranged to transport a plurality of slots around the ring interconnect between the nodes in order to transfer items of traffic allocated into those slots between components connected to the nodes, the transporting of the slots being indicated schematically by the arrow 45 in FIG. 1. In this example, it is assumed that the ring interconnect is unidirectional, and in particular the slots are transported in an anticlockwise direction as shown in FIG. 1. However, in other example implementations the ring interconnect may be a bidirectional ring interconnect such that slots can be transported in both anticlockwise and clockwise directions.

For each item of traffic, one of the components will act as a source to allocate that item of traffic into an available slot via that source's associated node, and another component will act as the destination to seek to remove that item of traffic from the ring interconnect when the slot allocated for that item of traffic is received at the destination's associated node. Hence, purely by way of example, the component 60 may insert an item of traffic into an available slot when that available slot passes through node 25, and then once that item of traffic has been transported around the ring to the node 15, the component 50 may seek to remove that item of traffic from the ring interconnect, assuming component 50 is the intended destination for the item of traffic.

Whilst in one example implementation the number of slots may be equal to the number of nodes provided by ring interconnect, it should be noted that this is not a requirement, and the number of slots may in some instances differ to the number of nodes. For example, as indicated by the dotted boxes 35, 40, one or more register slices may be inserted in the paths between one or more of the nodes, for example to meet timing requirements, and hence the total number of slots may be equal to the number of nodes plus the number of register slices provided, in this simple example of FIG. 1 this meaning that there may be six slots provided.

In accordance with the techniques described herein, the ring interconnect is arranged in a default mode of operation to allow all of the slots to be available for transfer of any items of traffic, hence making most efficient use of the available resources. However, in order to seek to avoid a throughput inhibiting condition arising, such as a denial of service (DoS) condition or a deadlock condition, the apparatus providing the ring interconnect 10 may further comprise special slot management circuitry that is responsive to a throughput alert trigger indicating a potential for occurrence of a throughput inhibiting condition, to cause one of the slots to be reserved as a special slot that is constrained for use only when one or more determined conditions are met. The one or more determined conditions can be arranged so as to cause the special slot to be used in a manner that seeks to avoid the throughput inhibiting condition arising. When the potential for occurrence of the throughput inhibiting condition is then subsequently determined no longer to be present, the ring interconnect can return to the default mode of operation where all slots are available for transfer of any items of traffic.

The special slot management circuitry can take a variety of forms, and hence could for example be formed by some centralised circuitry that operates in association with the ring interconnect to control the use of the special slot in the presence of the throughput alert trigger. However, as shown in FIG. 1, in one example implementation the special slot management circuitry is provided in a distributed manner, in particular by providing one or more special slot management elements 70, 72, 74, 76 in association with each of the nodes 15, 20, 25, 30. In one example implementation, the special slot management elements can be provided as components within the nodes. However, in some implementations, one or more of the special slot management elements could instead be provided within the associated components 50, 55, 60, 65 connected to the nodes.

As will be discussed in more detail later, the ring interconnect 10 is arranged to transport the special slot around the ring interconnect with associated metadata, and each of the nodes and register slices provided by the ring interconnect will contain storage structures to enable that associated metadata to be captured in association with the special slot as the special slot is transported around the ring. It should be noted that in normal use, none of the slots have active associated metadata, and only once the throughput alert trigger has caused one of the slots to be reserved as the special slot is the associated metadata then populated in association with that special slot for transport around the ring interconnect with the contents of the special slot. The special slot management circuitry is used to control the associated metadata and maintain that metadata so as to enable the one or more determined conditions constraining use of the special slot to be determined from that associated metadata by any entity that is considering use of the special slot.

Figure 2:
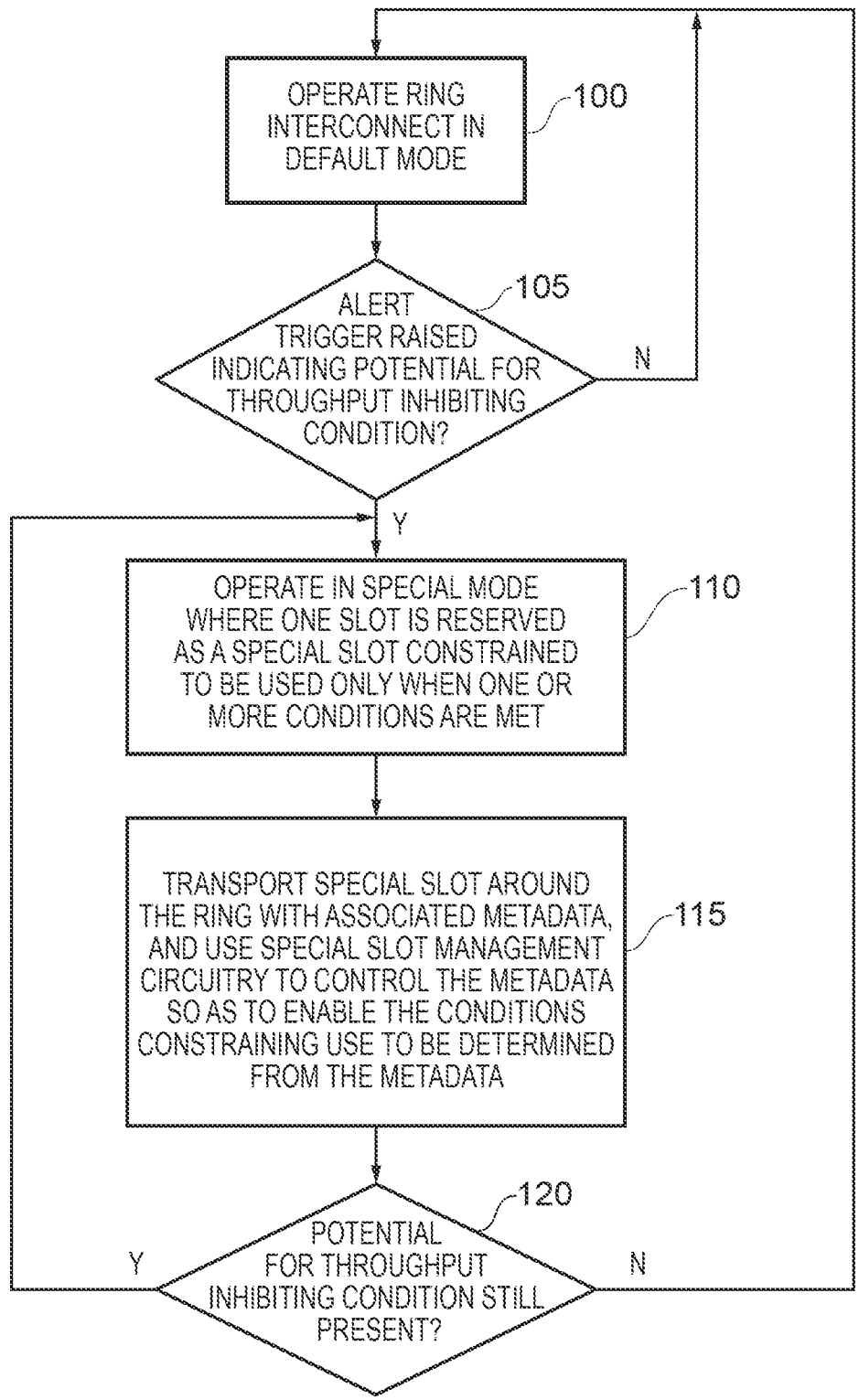
FIG. 2 is a flow diagram illustrating operation of a ring interconnect in accordance with one example implementation.

FIG. 2 is a flow diagram illustrating operation of the ring interconnect 10 of FIG. 1 in accordance with one example implementation. At step 100, the ring interconnect is operated in the earlier-mentioned default mode of operation. At step 105, it is determined whether an alert trigger has been raised indicating the potential for a throughput inhibiting condition. As will be discussed in more detail later, there are a number of ways in which the alert trigger could be raised, dependent on factors such as the type of throughput inhibiting condition being monitored, the component that may give rise to the throughput inhibiting condition and/or the component that may be affected by the throughput inhibiting condition should it arise.

Whilst the alert trigger is not raised, the ring interconnect remains in the default mode at step 100, but when the alert trigger is raised at step 105, the process then proceeds to step 110 where the ring interconnect is operated in a special mode where one slot is reserved as a special slot constrained to only be used when one or more conditions are met.

Figure 3:
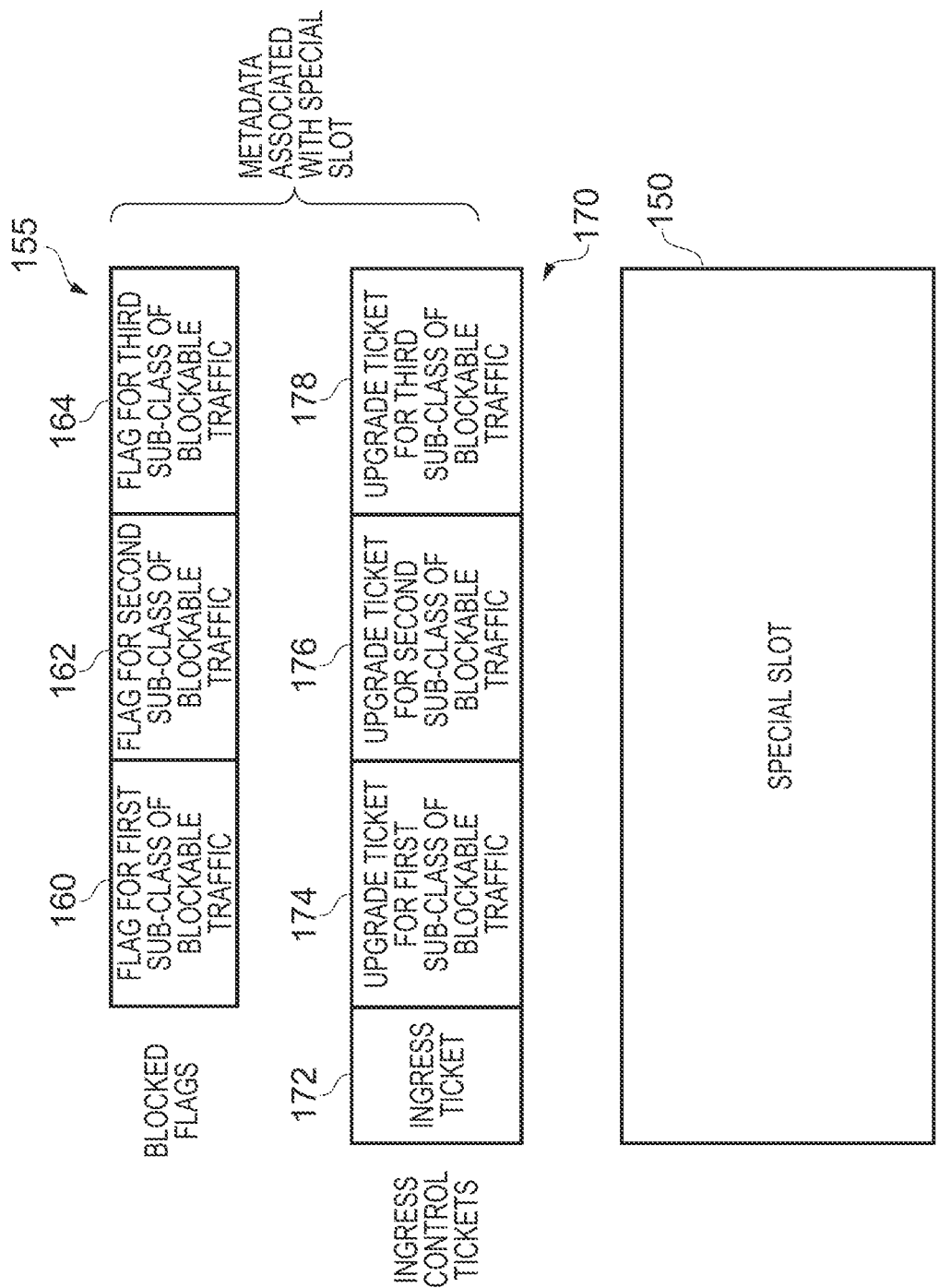
FIG. 3 schematically illustrates a slot transported around the ring interconnect that has been designated as a special slot, along with associated metadata that may be provided for that special slot, in accordance with one example implementation.

At step 115, the special slot is transported around the ring with associated metadata, and the special slot management circuitry is used to control the metadata so as to enable the conditions constraining use of the special slot to be determined from that metadata. At step 120, it is determined whether the potential for the throughput inhibiting condition is still present. Whilst it is, the ring interconnect continues to operate in the special mode, and hence loops through steps 110, 115 and 120. However, once the potential for the throughput inhibiting condition is no longer present, the process returns to step 100 where the ring interconnect is then operated in the default mode, at which point all of the slots are again available for use for transfer of any items of traffic. FIG. 3 schematically illustrates the special slot 150 and associated metadata. In the example implementation described herein, the associated metadata comprises both a series of blocked flags 155 and a series of ingress control tickets 170. As indicated in FIG. 3, and as will be discussed in more detail later, the block flags 155 comprise a sequence of flags 160, 162, 164, each flag being associated with a particular sub-class of blockable traffic, i.e. traffic that is destined for a particular type of blockable component that could cause the deadlock condition in some situations. The use of the blocked flags will be described in more detail later with reference to FIGS. 7 and 8, but in summary if a blocked flag is set then the special slot cannot contain traffic of the same sub-class as indicated by that blocked flag. Further, the ingress control tickets 170 include an ingress ticket 172 and in addition include a series of upgrade tickets 174, 176, 178, each upgrade ticket being associated with a particular sub-class of blockable traffic. The use of the ingress ticket and upgrade tickets will be described in more detail later with reference to FIGS. 9A and 9B. As will be apparent from the discussions herein, normal slots do not have any of the flags or ticket information set, and that metadata information is only used when the special slot is activated.

Figure 4A:
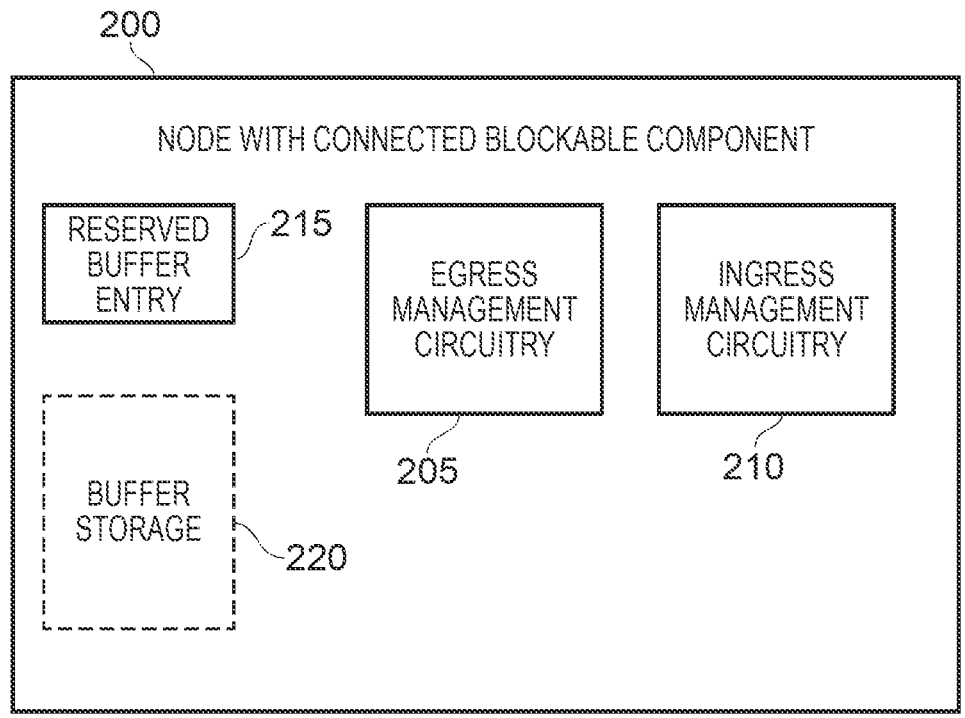
FIGS. 4A and 4B are block diagrams illustrating components that may be provided within a node that is connected to a blockable component and within a node that is connected to an unblockable component, respectively, in accordance with one example implementation.
Figure 4B:
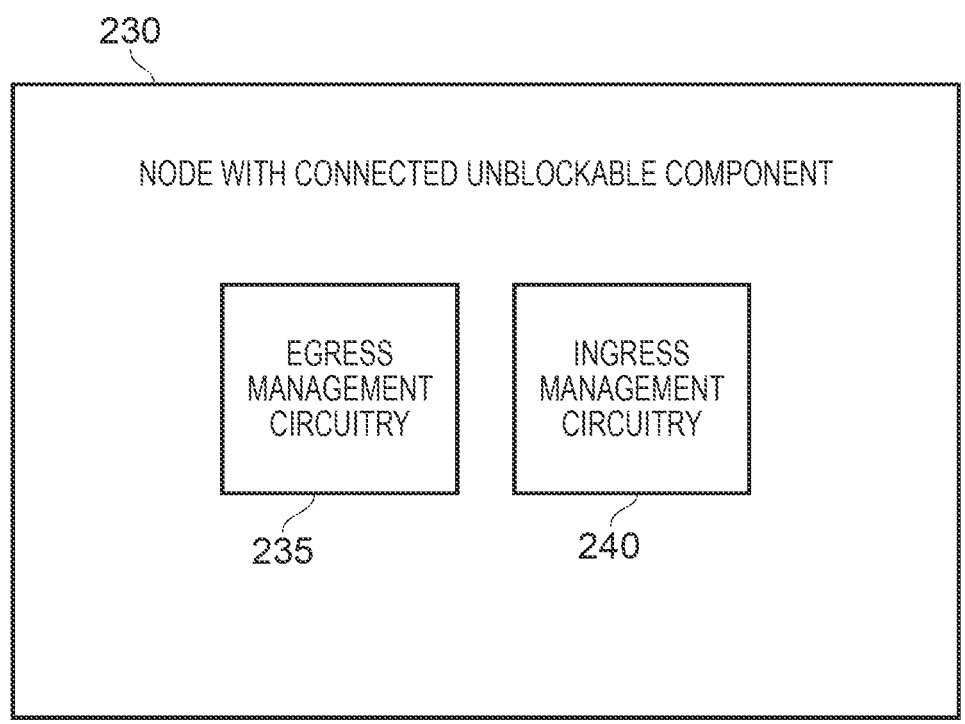

FIGS. 4A and 4B are block diagrams schematically illustrating special slot management elements that may be provided in association with nodes of the ring interconnect.

FIG. 4A shows some components that may be provided in a node 200 that has at least one blockable component connected to it. Similarly, FIG. 4B illustrates components that may be provided within a node 230 that only has an unblockable component or unblockable components connected thereto. As shown in FIG. 4A, the node 200 may have egress management circuitry 205 used to seek to prevent an egress denial of service condition arising, and ingress management circuitry 210 used to seek to prevent an ingress denial of service condition arising. The egress management circuitry 205 can be replicated for each component connected to the node 200 that is to be used as the destination for items of traffic transported around the ring interconnect. Whilst the ingress management circuitry could also be replicated for each component connected to the node 200 that is to act as source for items of traffic inserted into the ring interconnect, in one example implementation the ingress management circuitry is provided once per node, and is used to manage ingress of traffic from any component connected to that node.

As will be apparent from FIG. 4B, within a node 230 that only has an unblockable component or unblockable components connected to it, then egress management circuitry 235 and ingress management circuitry 240 may also be provided in association with that node. The egress management circuitry 235 may operate in the same way as the egress management circuitry 205, and similarly the ingress management circuitry 240 may operate in the same way as the ingress management circuitry 210. The operation of these components will be discussed in more detail later with reference to the flow diagrams of FIGS. 8, 9A and 9B.

As also shown in FIG. 4A, in association with a node that has at least one blockable component connected to it, a reserved buffer entry 215 may be provided as part of the special slot management circuitry. The reserved buffer entry 215 is replicated for each blockable component connected to the node 200. The reserved buffer entry 215 can be provided as a separate structure, or can instead be included as one of the entries within an associated buffer storage of the blockable component that is used to buffer items of traffic received from the ring interconnect for that blockable component. Such a buffer storage could be provided within the blockable component itself, or, as indicated by the dotted box 220 in FIG. 4A, could be provided within the node 200 in association with the connected blockable component. The use of the reserved buffer entry will be discussed in more detail later with reference to FIG. 7.

It should be noted that whilst in FIGS. 4A and 4B the various illustrated components are shown as being provided within the relevant nodes 200, 230, one or more of these components may alternatively be provided within the associated component if desired.

As mentioned earlier, the throughput inhibiting condition can take a variety of forms, but in the examples described herein the techniques are used to seek to prevent a denial of service condition and/or a deadlock condition from arising. A denial of service condition can arise in relation to any of the components connected to the ring interconnect, either in connection with such components seeking to receive traffic from the ring interconnect, or in connection with such components seeking to insert traffic into the ring interconnect. Further, one or more of the components may operate in a manner that can potentially lead to a deadlock condition arising under certain circumstances.

Figure 5:
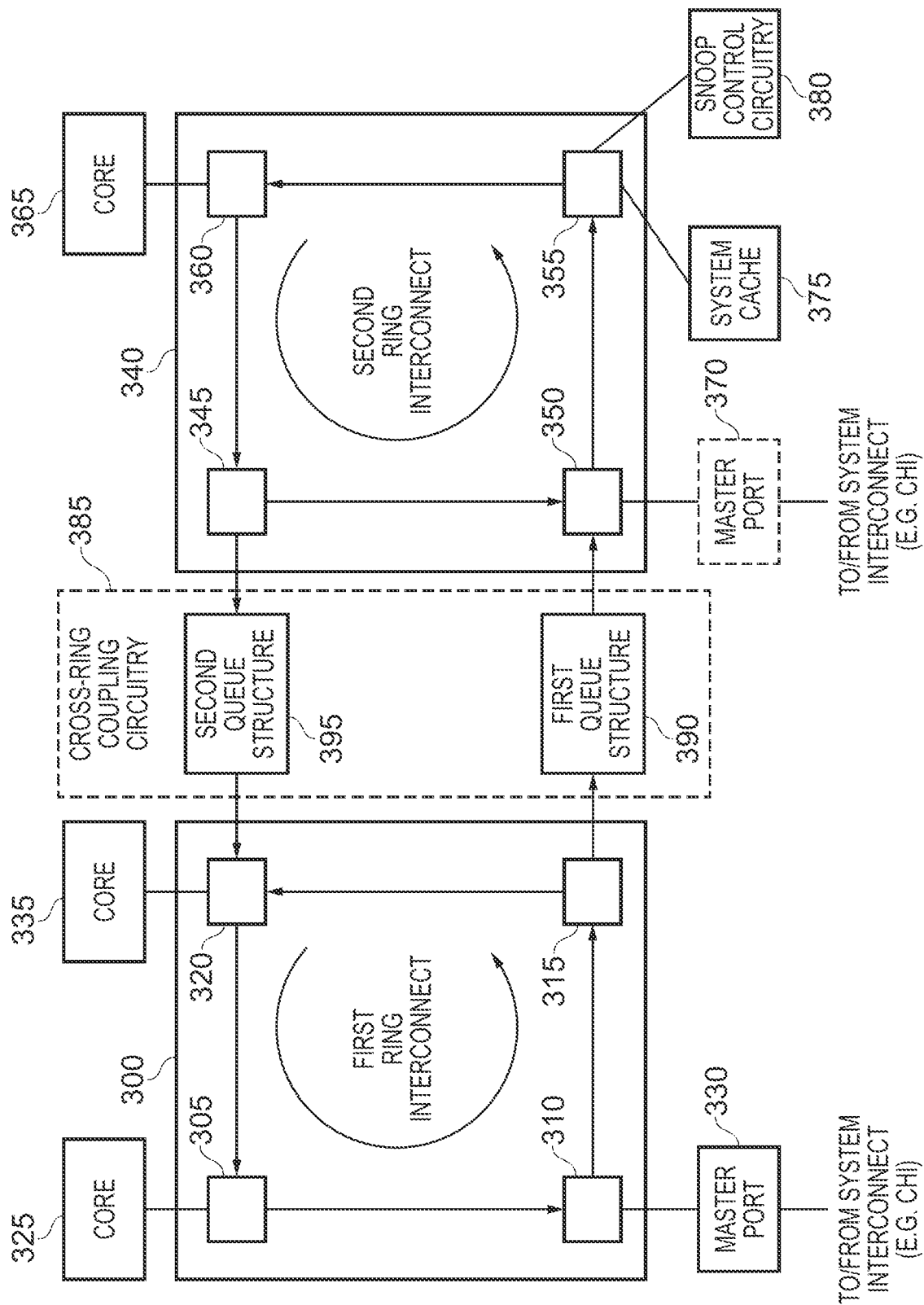
FIG. 5 schematically illustrates a system in accordance with one example implementation, that has two interconnected ring interconnects.

FIG. 5 illustrates an example implementation where a number of different types of blockable component are used that can each independently give rise to the deadlock condition in certain circumstances. In this example, a first ring interconnect 300 is formed by a plurality of nodes 305, 310, 315, 320, with slots being transported around the ring in an anticlockwise direction between those nodes, so as to allow traffic to be transferred between components 325, 330, 335, 390, 395 connected to nodes of that ring interconnect. As will be discussed in more detail later, each of the queue structures 390, 395 may actually present themselves to the ring interconnect 300, and indeed to the further ring interconnect 340, as multiple components, one for each sub-class of traffic routed via those queue structures 390, 395.

As also shown in FIG. 5, a second ring interconnect 340 is provided having nodes 345, 350, 355, 360. Again, it is assumed that the slots are transported around the ring in an anticlockwise direction, enabling traffic to be transferred between components 365, 370, 375, 380, 390, 395 connected to nodes of that ring interconnect. As shown in FIG. 5, the first queue structure 390 and second queue structure 395 can be viewed as collectively providing cross-ring coupling circuitry 385 for coupling the first ring interconnect 300 with the second ring interconnect 340. Through use of the cross-ring coupling circuitry, traffic can be inserted by a component on one ring, for transfer to a destination component on another ring. By way of specific example, if the processor core 325 is a source for a particular item of traffic, and the system cache 375 is the associated destination, then in the first instance the first queue structure 390 is the destination for that item of traffic from the perspective of the first ring 300, but from the perspective of the second ring 340 the first queue structure 390 acts as the source of that item of traffic, and the system cache 375 acts as the destination for that item of traffic.

A variety of different components can be connected to the various nodes of the two ring interconnects 300, 340. Hence, as shown in FIG. 5, multiple different processor cores 325, 335, 365 may be connected to one or other of the ring interconnects, and could for example be arranged to share a system cache 375 connected to a node on the second ring interconnect 340. In association with the system cache, snoop control circuitry 380 may be provided, which can be viewed as a separate component connected to node 355 of the second ring interconnect 340, the snoop control circuitry being used to implement a cache coherency protocol to ensure that each of the processor cores 325, 335, 365 observes the most up to date version of data when seeking to access that data. In particular, one or more of the processor cores 325, 335, 365 may have local cache structures that can be used to cache data, and it is important to ensure that when any one of those cores requests access to an item of data, it accesses the most up to date version of that data. Any suitable cache coherency protocol can be implemented by the snoop control circuitry.

As also shown in FIG. 5, a master port 330 can be used to connect the ring interconnect 300 to a further interconnect that may act, for example, as a system interconnect, and which can be constructed in any suitable manner. For instance, the system interconnect need not be a ring interconnect, but could for example adopt any other interconnect topology. Further, the system interconnect may operate in accordance with a particular interconnect protocol that enforces certain constraints on the handling of traffic routed via it. Purely by way of specific example illustration, the system interconnect may operate in accordance with the Arm AMBA CHI (Coherent Hub Interface) protocol.

In accordance with the CHI protocol it may be a requirement that the master port 330 can accept all read data that that master port has requested from the system interconnect, and if for any reason the master port 330 is unable to accept all read data, then the system interconnect may be allowed to delay accepting write data from the master port 330. This can potentially give rise to a deadlock situation, for example if the ring interconnect 300 is full of write data that is destined for the master port 300. In this situation, then there is no further room on the ring interconnect 300, and so the master port cannot accept any read data that the system interconnect is seeking to transfer via the master port 330 to the ring interconnect 300. Hence, the system interconnect may decide not to accept any write traffic from the master port, and as such the master port cannot drain the write data from the ring interconnect, thereby leading to the deadlock condition arising.

It should be noted that whilst a single master port 330 may be provided within such a system, as shown in FIG. 5 one or more additional master ports 370 may also be provided, either to seek to improve bandwidth with a particular system interconnect, or indeed to provide a separate connection to another different interconnect, and any such master ports can be provided on either ring interconnect 300, 340. It will be also be appreciated that the earlier described deadlock condition could occur independently in connection with any such master port.

As another example of components that can give rise to the deadlock condition, then either of the first queue structure 390 or the second queue structure 395 are blockable components that could potentially give rise to the deadlock condition. In particular, if the first ring is full of traffic trying to get to the other ring, whilst the other ring is full of traffic trying to get to the first ring, neither queue structure can drain, leading to deadlock.

In order to distinguish between the various different sub-classes of blockable traffic, each associated with a corresponding type of blockable component, each ring interconnect can be arranged to handle different classes of traffic. In particular, both a blockable traffic class and a non-blockable traffic class can be transported around the rings, and with regards to the blockable class, a number of different sub-classes of blockable traffic can be identified. For example, traffic whose destination is on the same ring, and whose destination is not a master port 330 or one of the queue structures 390, 395 within the cross-ring coupling circuitry 385, can be designated as same ring other traffic, and forms non-blockable traffic. In particular, it is observed that any traffic for such destinations can drain eventually without there needing to be any progress in respect of other types of traffic. With regard to the blockable traffic, then three sub-classes of blockable traffic may be identified. The first sub-class is same ring master port traffic that is destined for a master port component on the same ring as that traffic, the second sub-class of blockable traffic is cross-ring master port traffic destined for a master port component on a different ring to the ring containing the traffic, and the third sub-class is cross-ring other traffic destined for a component other than a master port component on a different ring to the ring containing the traffic.

Figure 6:
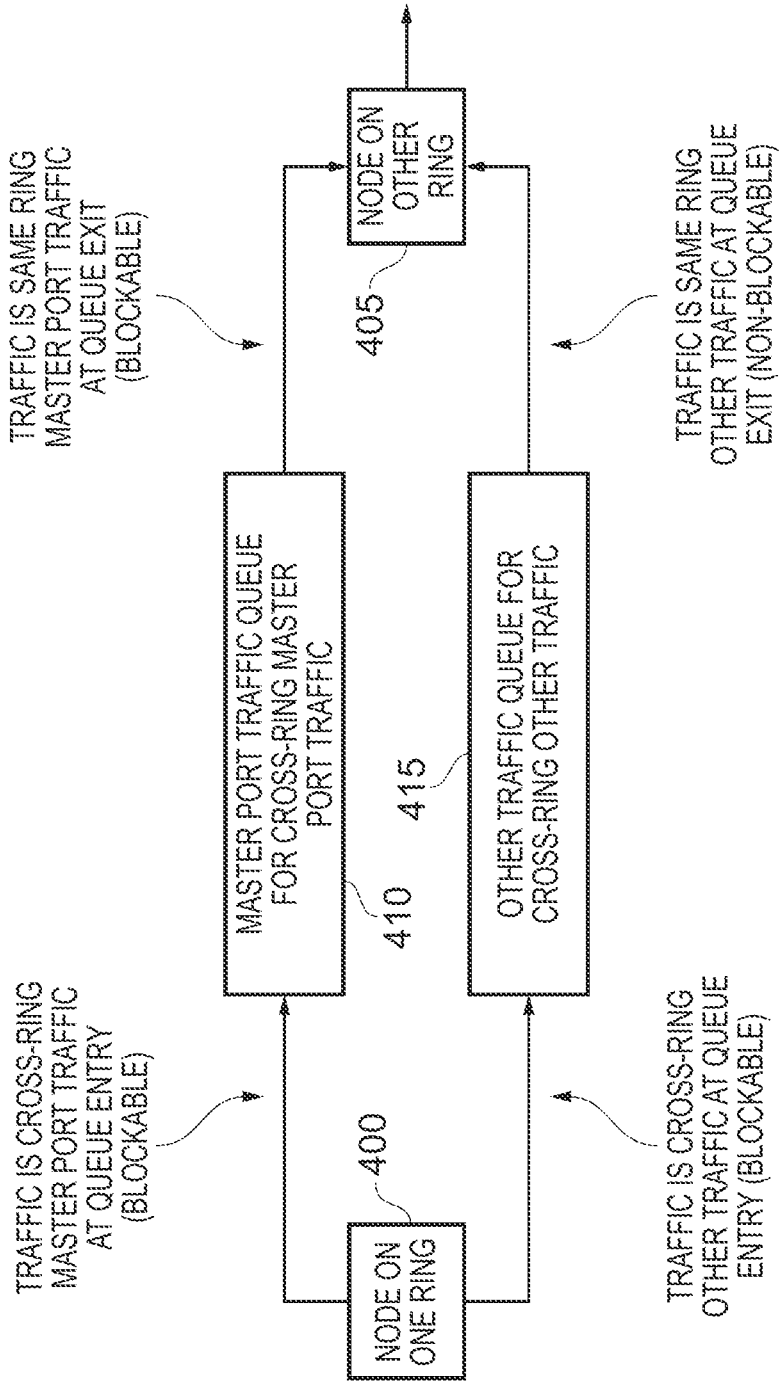
FIG. 6 illustrates a particular example implementation that may be used for each of the queue structures shown in FIG. 5, where each queue structure forms two components coupled between nodes on each of the ring interconnects.

In such an implementation, each of the queue structures 390, 395 can be viewed as presenting two components to the respective ring interconnects 300, 340, one for each of the different types of cross-ring traffic. The way in which the first and second queue structures 390, 395 are constructed may vary dependent on implementation. Hence, for example, in some implementations it may be possible for each queue structure to maintain a single queue, provided that it can distinguish between the two different types of cross-ring traffic, and insert and remove traffic of those different types independently from each other. However, as shown in FIG. 6, in one particular example implementation each queue structure is formed as two separate components having an associated queue 410, 415. Hence, the first component includes a master port traffic queue 410 to hold cross-ring master port traffic, whilst the second component has another traffic queue 415 to hold cross-ring other traffic. It should be noted that each of these queues/components 410, 415 is connected to both a node 400 on the ring for which those components are forming a destination, and a node 405 on the other ring for which those components are forming a source.

As indicated in FIG. 6, the traffic routed from node 400 to the queue 410 is cross-ring master port traffic at the point of queue entry, and hence is blockable traffic. At the point of queue exit from the queue 410 to the node 405, that traffic becomes same ring master port traffic, which is still blockable traffic, but which is a different sub-class of traffic to the sub-class presented at queue entry.

Similarly, in respect of the other traffic queue 415, the traffic entering that queue is cross-ring other traffic at the point of queue entry, and is hence blockable traffic, but becomes same ring other traffic at the point of queue exit to the node 405, hence becoming non-blockable traffic.

It will be noted that in the example of FIG. 5 two ring interconnects are shown. However, the techniques described herein can be extended to situations where there are more than two ring interconnects that are coupled together. For example, a third ring interconnect could be coupled to the second ring interconnect via a further cross-ring coupling circuit, and traffic can then be transported between each of the three rings using the cross-ring coupling circuits. In such situations, it will be appreciated that additional sub-classes of blockable traffic could be identified, for instance to identify the ring that is the destination for that traffic. For example, traffic that is being sent from the first ring interconnect to either the second ring interconnect or the third ring interconnect could be cross-ring blockable traffic (either cross-ring master port traffic or cross-ring other traffic) at the point of receipt by the cross ring coupling circuitry 385, but when that traffic is drained from the queue structure 390 of the cross-ring coupling circuitry 385 onto the second ring interconnect, whether it becomes same ring traffic or still remains other ring traffic will depend on whether the destination is connected to the second ring interconnect or the third ring interconnect. If desired, the queue structures can be extended to provide separate queues for each of the different sub-classes of traffic in such situations.

Figure 7:
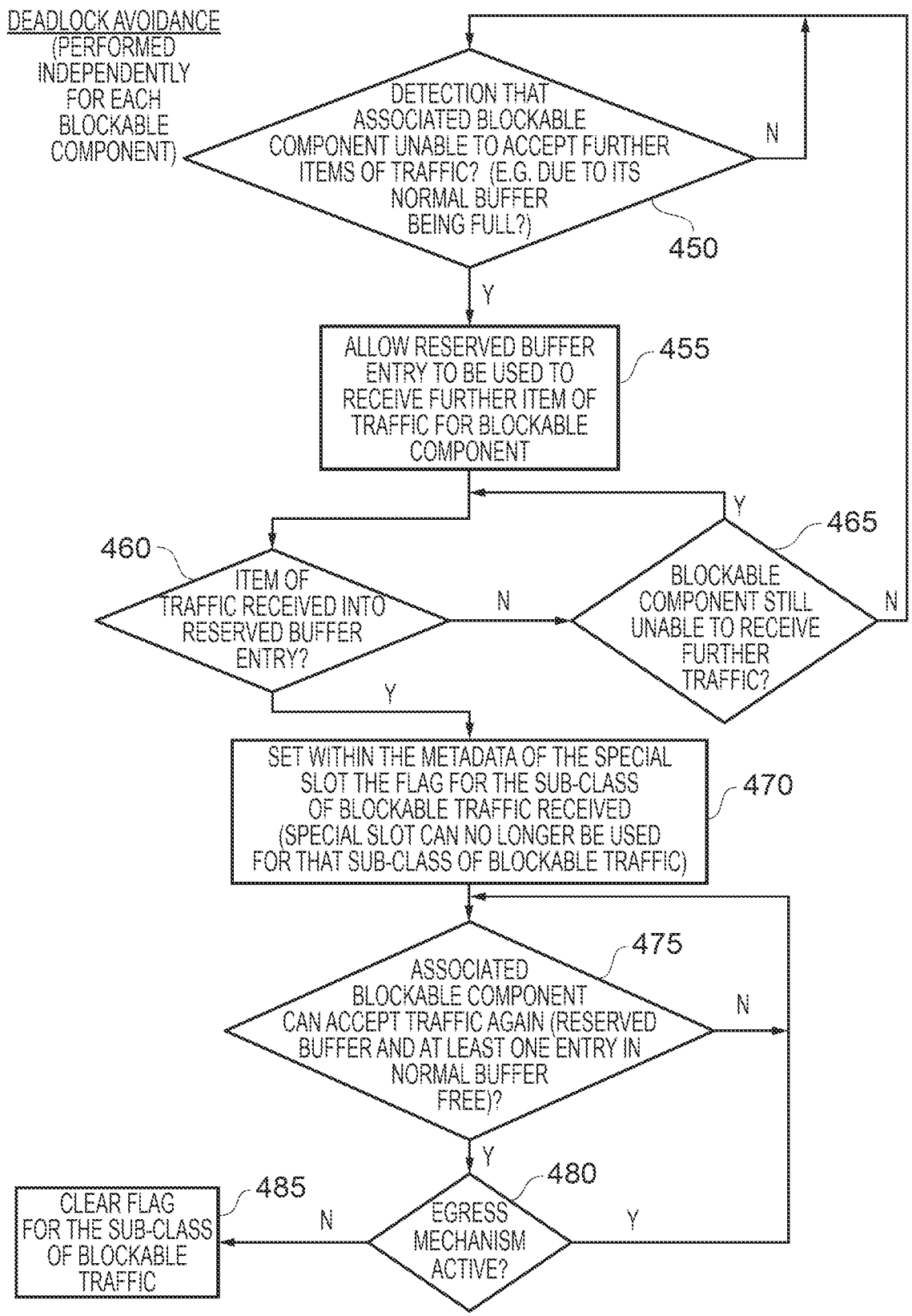
FIG. 7 is a flow diagram illustrating steps performed when operating a ring interconnect in order to avoid deadlock, in accordance with one example implementation.

FIG. 7 is a flow diagram illustrating how the techniques described herein can be used to avoid a deadlock condition arising. The steps performed in FIG. 7 may be performed independently in association with each blockable component within the system, and in particular by the special slot management element(s) provided in association with that blockable component. At step 450, it is determined whether it has been detected that the associated blockable component is unable to accept further items of traffic. This could be detected in a variety of ways, but could for example be detected due to the fact that that blockable component's normal buffers are considered full. Hence, referring to FIG. 4A, such a condition may be detected if the buffer storage 220 is determined to be full, it being noted at this point that the reserved buffer entry 215 will still be available, irrespective of whether that is provided as a separate entity, or is a specific designated entry within the buffer storage 220 (i.e. the reserved buffer entry is treated as separate to the buffer storage when assessing whether the buffer storage is full, irrespective of whether it is physically separate to the buffer storage or not).

When at step 450 such a condition is detected, then at step 455 the reserved buffer entry 215 is allowed to be used to receive a further item of traffic for the blockable component. However, the reserved buffer entry is only allowed to accept traffic from the special slot. In one example implementation the special slot is a fixed slot, and accordingly any particular node/destination will know in advance when that special slot will arrive, and hence can detect when that slot contains traffic destined for it.

It is then determined at step 460 whether an item of traffic has been received into the reserved buffer entry, and if not it is determined at step 465 whether the blockable component is still unable to receive further traffic. If, at this point the blockable component can receive further traffic, then the process merely returns to step 450, but assuming the blockable component still cannot receive further traffic the process loops back to step 460.

If at step 460 it is determined that an item of traffic has been received into the reserved buffer entry, then at step 470 the special slot management circuitry sets within the metadata of the special slot a flag for the sub-class of blockable traffic received. Hence, purely by way of example, if the process of FIG. 7 is being performed by special slot management elements associated with the master port 330, then once an item of traffic has been received into the reserved buffer entry, the flag for the same ring master port traffic will be set, meaning that the special slot can no longer be used for that sub-class of blockable traffic. This ensures that the special slot is retained free for use by other traffic, thus preventing the deadlock condition from occurring.

Thereafter, it is determined at step 475 whether the associated blockable component can now accept traffic again. For this condition to arise, the reserved buffer entry must now be free, and there must be at least one entry free in the normal buffer. When such a condition is detected, it is then determined whether the egress mechanism is active at step 480. This mechanism will be discussed in more detail later with reference to FIG. 8. Whilst the egress mechanism is active, then in situations where the flag has been set for the relevant sub-class of blockable traffic, that flag cannot be cleared until the egress mechanism is no longer active. Hence, at step 480 the process can only proceed to step 485 in order to clear the flag for the sub-class of blockable traffic in situations where the egress management circuitry associated with the particular blockable component in question is not currently implementing the egress mechanism described with reference to FIG. 8. Hence, in summary, once the flag has been set for the relevant sub-class of blockable traffic, it will only be cleared again when the associated blockable component can accept traffic again, and any activated egress mechanism for that blockable component is no longer active.

Considering the use of the reserved buffer entry in association with each destination component that has the potential to become blocked, then it will be appreciated from the above described example implementation that for all destinations that handle a particular sub-class of blockable traffic, at most one of them can have its reserved buffer entry utilised at any point in time. In particular, as soon as the reserved buffer entry is utilised for one of those destinations, then the blocked flag for that sub-class of traffic is set in association with the special slot. Further, in order for the blocked flag to be cleared, then all of the destinations for that associated sub-class of traffic must have at least the reserved buffer entry free. Further, the special ring slot will always egress from the ring the first time it reaches its destination, in situations where that destination is a blockable component such as the master port or the cross-ring queue, since those components have the reserved buffer entry available.

It should also be noted that the techniques described herein alleviate the potential for deadlock to arise in relation to blockable cross-ring queues, in much the same way as they do so for any other blockable components, for example the earlier-mentioned master ports. Hence, with regards to the ability to ensure that the cross-ring queues drain, it is noted that the special slot ensures space for non-cross-ring destinations to drain even when the cross-ring queue is full in the other direction. Further, as will be noted from the earlier described FIG. 6, cross-ring master port traffic can be blocked if same ring master port traffic is blocked on the destination ring, but cross-ring other traffic cannot be blocked because same ring other traffic cannot be blocked on the destination ring.

Figure 8:
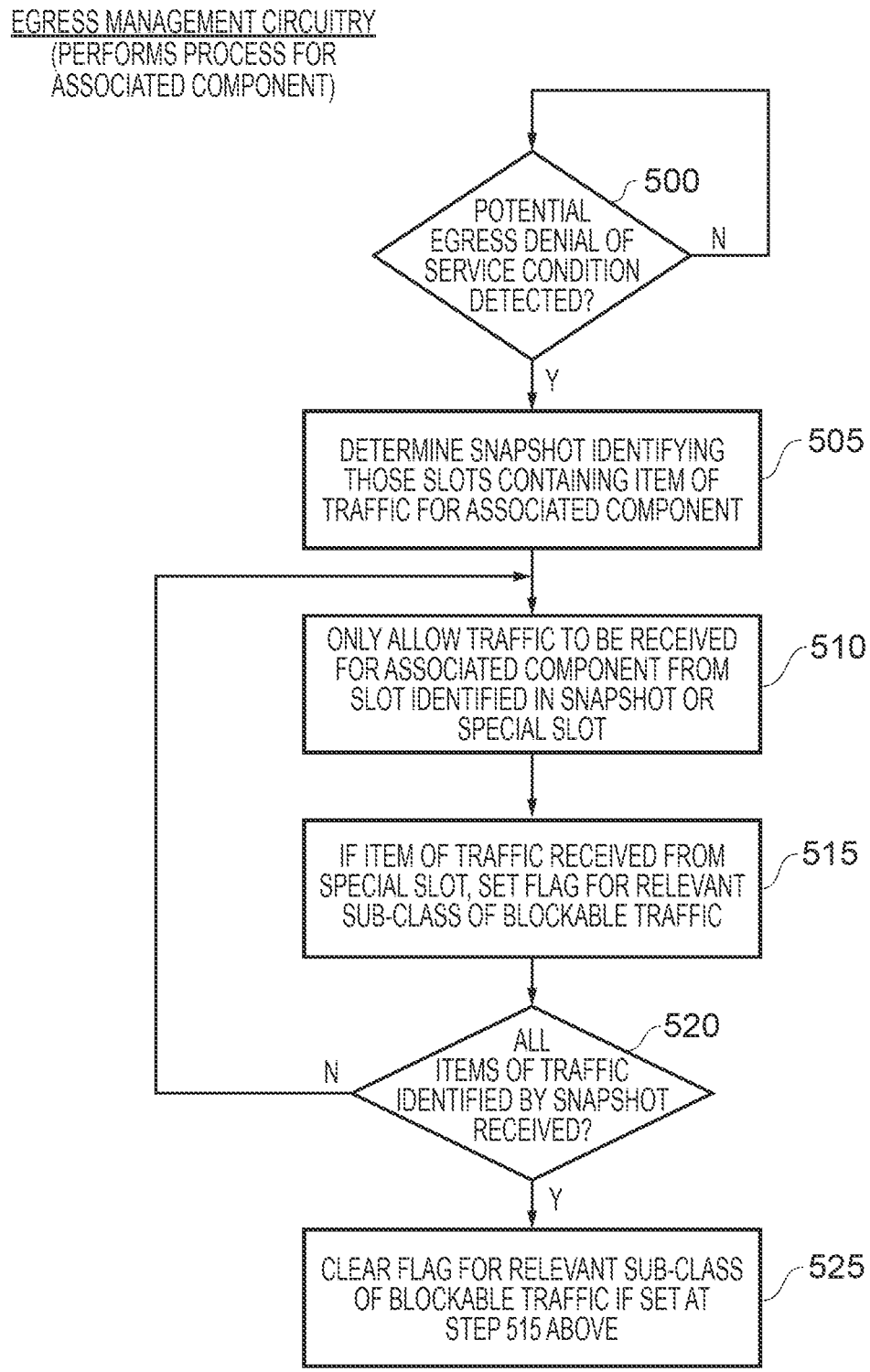
FIG. 8 is a flow diagram illustrating the operation of egress management circuitry in accordance with one example implementation, in order to avoid an egress denial of service condition arising.

FIG. 8 is a flow diagram illustrating operation of the egress management circuitry, and in particular describes the functionality performed by each egress management circuit independently for its associated component. At step 500, it is determined whether a potential egress denial of service condition has been detected. Any suitable mechanism could be used for detecting such a situation, for example the busyness of the destination component could be monitored, in particular to monitor its ability to receive traffic from slots being transported around the ring. Then, if the traffic for that destination that is present in one or more slots stays on the ring for an unacceptable length of time (where that unacceptable length of time can be set dependent on implementation but could for example be specified in terms of number of re-spins of that traffic around the ring), this could be used to trigger a potential egress denial of service condition at step 500.

When at step 500 the potential egress denial of service condition is detected, then at step 505 the egress management circuitry determines a snapshot identifying those slots on the ring interconnect that contain items of traffic for the associated component. The snapshot can be acquired in a variety of ways. For example, the egress management circuitry can monitor the contents of the slots as each of the slots is passed through its associated node, and hence could, following the potential egress denial of service condition being detected, collate the snapshot information during the time period it takes for a slot to fully traverse the ring. Alternatively, such monitoring could be performed in advance, so that when the potential egress denial of service condition is detected, the egress management circuitry already has all the information necessary to determine the snapshot. By way of specific example, if the egress management circuitry already tracks which slots have re-spun, i.e. which slots have already passed through the node once without their contents having been accepted, then it can use that information so as to include in the snapshot only the re-spun slots which are known to be containing traffic for the associated destination.

Following step 505, then it is now known which slots at the time the snapshot was taken contain traffic destined for the associated component. At step 510, the egress management circuitry only allows traffic to be received for the associated component from a slot that is identified within the snapshot, or from the special slot. Whenever traffic is received from a slot identified in the snapshot, that slot can then be removed from the snapshot, so that over time the number of slots identified in the snapshot decreases.

As indicated by step 515, if an item of traffic is received from the special slot, then the flag for the relevant sub-class of blockable traffic is set. It should be noted that this occurs irrespective of whether the reserved buffer entry 215 is being used.

At step 520, it is determined whether all of the items of traffic identified by the snapshot have been received, and if not the process returns to step 510. However, once all items of traffic have been received, then at step 525 the flag for the relevant sub-class of blockable traffic is cleared if that flag had been set at step 515 earlier during the process of FIG. 8. By ensuring the flag cannot be cleared until step 525, this ensures that the special slot cannot be re-used until all existing slots identified in the snapshot have had their traffic egressed from the ring, hence ensuring that at most the special slot can be used once, and thus ensuring that the use of the special slot itself cannot give rise to an egress denial of service condition.

Through the above described use of the reserved buffer entry, in combination with the operation of the egress management circuitry as described above, deadlock can be prevented. In particular, the operation of the egress management circuitry ensures that any ring slot will eventually drain if its destination is not blocked. Therefore same ring other traffic will always eventually drain. If a destination is blocked, then the earlier described use of the reserved buffer entry and the blocked flags for the special slot ensure that the special slot cannot have traffic for that destination or indeed for any other destination handling the same sub-class of traffic. Therefore the special slot is always eventually available for use by any traffic that is not blocked. In combination with the operation of the egress management circuitry this hence ensures that deadlock is prevented.

Figure 9A:
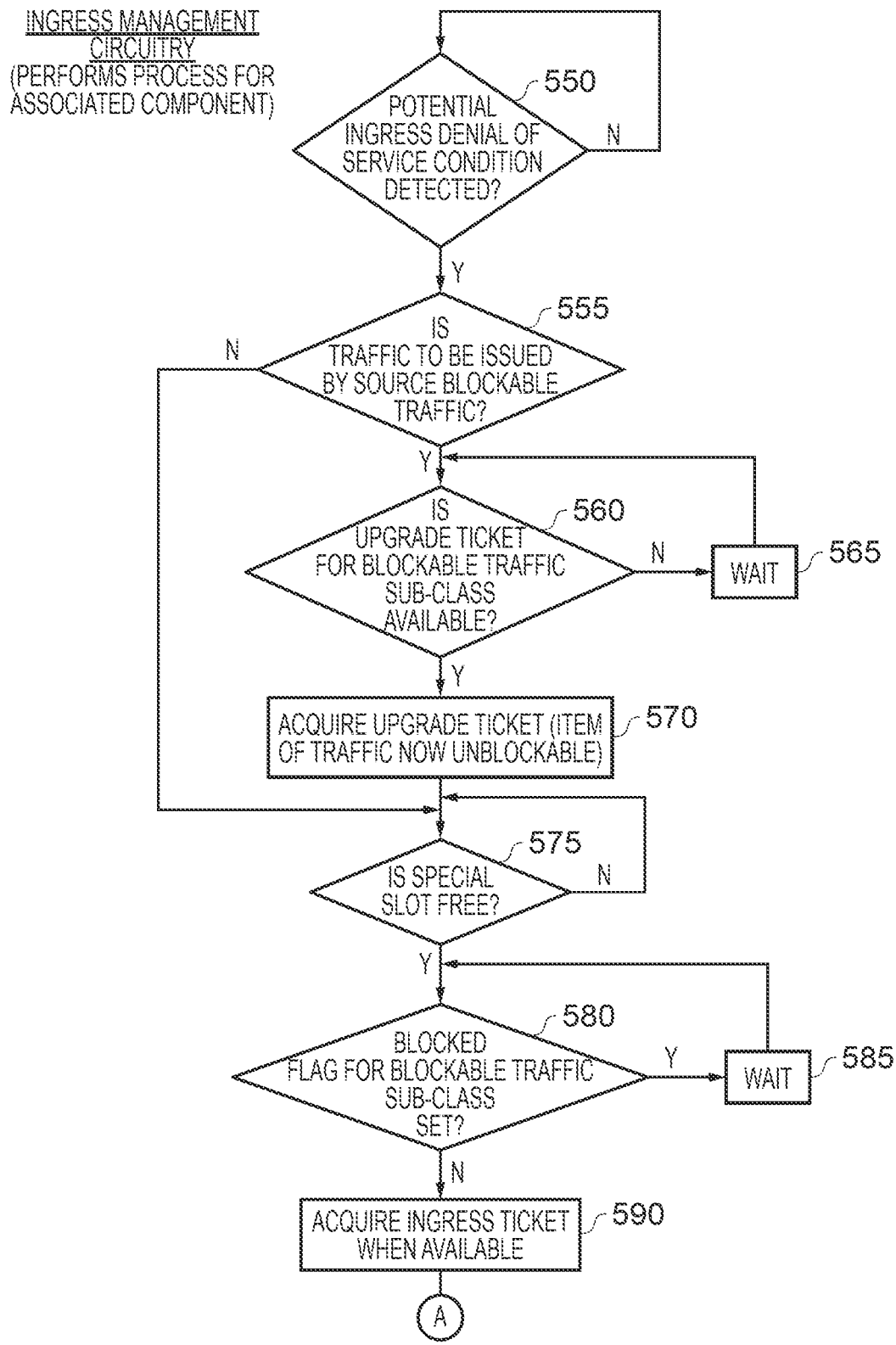
FIGS. 9A and 9B provide a flow diagram illustrating the operation of ingress management circuitry in accordance with one example implementation, in order to avoid an ingress denial of service condition arising.
Figure 9B:
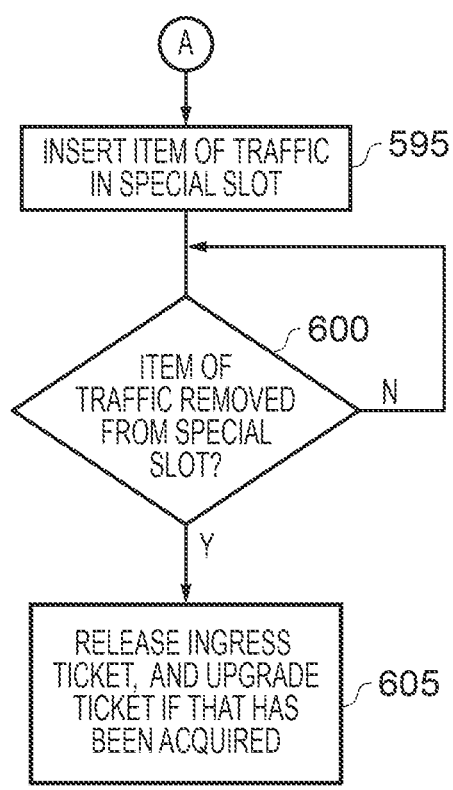

FIGS. 9A and 9B are a flow diagram illustrating the operation of ingress management circuitry, and in particular illustrate the operation that the ingress management circuitry can perform for an associated component. At step 550, the ingress management circuitry determines whether a potential ingress denial of service condition has been detected for the associated component. It will be appreciated that a number of techniques could be used to detect such a potential ingress denial of service condition. For example, it may be detected when the associated component is having difficulty allocating, or is unable to allocate, new items of traffic onto the ring, which could for example arise due to there being a low number of available slots on the ring at that point in time.

Once a potential ingress denial of service condition has been detected, then at step 555 it is determined whether the traffic that the associated source component is attempting to issue is blockable traffic. If it is, then the source must first ensure the traffic it wants to send cannot be blocked from entering the special slot, and to achieve this uses the upgrade ticket mechanism described herein. In particular, at step 560 it is determined whether the upgrade ticket for the blockable traffic sub-class is available. If it is not, then the process waits at step 565, and then returns to step 560. Only once the upgrade ticket for the blockable traffic sub-class is available does the process then proceed to step 570 where the ingress management circuitry acquires the upgrade ticket for the relevant traffic sub-class. It can do this in a number of ways, for example by setting the upgrade ticket within the metadata associated with the special slot. Once the upgrade ticket has been acquired, the item of traffic that the associated component is seeking to send is now effectively upgraded to be unblockable, and other sources cannot use the special slot for traffic of that sub-class once the upgrade ticket has been acquired.

However, if the traffic to be issued is not blockable, then steps 560, 565 and 570 are not required, and the process can proceed directly from step 555 to 575. Once step 575 is reached, either directly from step 555 in the event of non-blockable traffic, or following step 570 in the event of blockable traffic, then it is determined whether the special slot is free. In one example implementation the ingress management circuitry will wait for the special slot to be free before acquiring the ingress ticket. In particular, there is the possibility that if the special slot is currently occupied, then the action of the destination component receiving that traffic from the special slot may cause one of the blocked flags to be set for a particular class of blockable traffic, and if that does occur and relates to the same class of sub-traffic that the source component associated with the ingress management circuitry is seeking to send, that would prevent that source from inserting the item of traffic into the special slot. In an alternative implementation, step 575 may only be needed if the current contents of the special slot are the same type of traffic as the traffic that the source component is seeking to add to the reserved slot.

Once it is determined at step 575 that the special slot is free, it is then determined at step 580 if the blocked flag for the blockable traffic sub-class associated with the item of traffic that the source is seeking to send is set, and if so the process waits at step 585 until that flag is no longer set. If in fact the source is seeking to send non-blockable traffic then this check will not apply, and the process can proceed to step 590.

Once the blocked flag is no longer set, then at step 590 the ingress management circuitry can acquire the ingress ticket when that ingress ticket is available. Then, at step 595 the ingress management circuitry can allow the source to insert the item of traffic into the special slot. Thereafter, it is determined at step 600 whether the item of traffic has been removed from the special slot, and when that has occurred then the ingress management circuitry can release the ingress ticket at step 605, at which point it will also release the upgrade ticket if that upgrade ticket had been acquired due to performance of step 570.

From the above described example implementations, it will be appreciated that the techniques described herein provide a mechanism that can be used to avoid deadlock and DoS conditions, whilst still allowing any type of traffic from any source to use any slot on the ring in normal conditions. When an abnormal condition is detected that might be indicative of a potential deadlock or DoS, once slot on the ring is then reserved as a special slot that can only be used under certain conditions. This guarantees space on the ring to transport traffic as necessary to break the deadlock or DoS condition, and once completed the special slot can be released back into normal use. A buffer provided in association with a destination can be used to ensure that the special slot can always egress off the ring when required but this buffer can be as small as a single entry, or could utilise part of an existing buffer that might already exist in association with the destination for other reasons. Also described herein is a distributed arbitration mechanism that makes sure that if the special slot is required by more than one traffic class, it can be safely used by them without blocking the higher priority traffic class. To perform the distributed arbitration and reserving of the special slot, a number of flags/tickets are described which travel around the ring as metadata in association with the special slot, and which special slot management elements provided in association with a source or destination can set to indicate that they have or want to restrict the use of the special slot in some way. This has been found to provide a particularly efficient mechanism for avoiding deadlock or DoS conditions within a ring interconnect.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising: a ring interconnect;
a plurality of nodes provided within the ring interconnect to connect to associated components;
wherein:
the ring interconnect is arranged to transport a plurality of slots around the ring interconnect between the nodes in order to transfer items of traffic allocated into those slots between components connected to the nodes, wherein for each item of traffic one of the components acts as a source to allocate that item of traffic into one of the slots via the source's associated node, and another component acts as a destination to seek to remove that item of traffic from the ring interconnect when the slot allocated for that item of traffic is received at the destination's associated node;
the ring interconnect is arranged in a default mode to allow all of the slots to be available for transfer of any items of traffic;
the apparatus further comprises special slot management circuitry that is responsive to a throughput alert trigger indicating a potential for occurrence of a throughput inhibiting condition, to cause a slot amongst the plurality of slots to be reserved as a special slot that is constrained for use only when one or more determined conditions are met, wherein the one or more determined conditions are arranged to cause the special slot to be used in a manner that seeks to avoid the throughput inhibiting condition arising;
the throughput inhibiting condition comprises a deadlock condition;
the ring interconnect is arranged to transfer items of traffic of multiple traffic classes between the components connected to its nodes, the multiple traffic classes comprising at least blockable traffic and non-blockable traffic;
wherein the blockable traffic is traffic whose destination is a blockable component that is able to cause the deadlock condition by virtue of being able to enter a state where that blockable component is unable to accept from the ring interconnect any item of traffic in a situation where each of the slots has been allocated an item of traffic for that blockable component;

the throughput alert trigger is a deadlock alert trigger raised in association with a given blockable component to indicate a potential for occurrence of the deadlock condition for that given blockable component; and the special slot management circuitry is arranged, in response to the deadlock alert trigger, to ensure that the special slot is reserved for use to transfer items of traffic that are destined for a component other than the given blockable component.

2. An apparatus as claimed in claim 1, wherein the ring interconnect is arranged to transport the special slot around the ring interconnect with associated metadata, and the special slot management circuitry is arranged to control the associated metadata so as to enable the one or more determined conditions constraining use of that special slot to be determined from the associated metadata.

3. An apparatus as claimed in claim 1, wherein:
the special slot management circuitry is arranged to implement an arbitration mechanism to arbitrate access to the special slot.

4. An apparatus as claimed in claim 1, wherein the special slot management circuitry is implemented by a plurality of distributed special slot management elements, where each distributed special slot management element is provided in association with one of the nodes.

5. An apparatus as claimed in claim 1, wherein the special slot is a predetermined slot amongst the plurality of slots.

6. An apparatus as claimed in claim 1, wherein the throughput inhibiting condition comprises at least one of a denial of service condition and a deadlock condition.

7. An apparatus as claimed in claim 1, wherein:
the blockable traffic comprises a plurality of sub-classes of blockable traffic, each sub-class of blockable traffic being associated with a component type;
the ring interconnect is arranged to transport the special slot around the ring interconnect with associated metadata, the associated metadata comprising a flag for each sub-class of blockable traffic;
the given blockable component has an associated given component type; and
the special slot management circuitry is arranged, in response to the deadlock alert trigger being raised for the given blockable component, to set the flag for the sub-class of blockable traffic associated with the given component type so as to prevent the special slot from being used for items of traffic destined for components of the given component type.

8. An apparatus as claimed in claim 7, wherein:
the special slot management circuitry comprises a reserved buffer entry associated with each blockable component that is arranged to only be used to accept an item of traffic from the special slot;
the special slot management circuitry is arranged, on detecting whilst the ring interconnect is in the default mode that the given blockable component is in a state that would prevent acceptance of further items of traffic, to cause the reserved buffer entry to be employed to receive a further item of traffic destined for that given blockable component provided that item of traffic is within the special slot; and
the special slot management circuitry is further arranged, in response to the further item of traffic being received into the reserved buffer entry, to set the flag for the sub-class of blockable traffic associated with the given component type.

9. An apparatus as claimed in claim 8, wherein:
the reserved buffer entry forms a final entry in a buffer storage associated with each blockable component, where the buffer storage is used to buffer items of traffic received from the ring interconnect for that blockable component; and
the special slot management circuitry is arranged to detect that the given blockable component is in a state that would prevent acceptance of further items of traffic when all entries in the buffer storage other than the final entry are full.

10. An apparatus as claimed in claim 7, further comprising:
egress management circuitry associated with each component connected to the ring interconnect that is able to act as a destination for an item of traffic;
wherein the egress management circuitry is responsive to detecting a potential egress denial of service condition for the associated component, to determine a snapshot identifying those slots within the plurality of slots currently containing an item of traffic destined for the associated component, and then to only allow an item of traffic to be received from the ring interconnect for the associated component when that item of traffic is either within one of the slots identified in the snapshot or is within the special slot, until each item of traffic identified by the snapshot has been received.

11. An apparatus as claimed in claim 10, wherein:
when an item of traffic is received for the associated component from the special slot at a time where at least one item of traffic is still identified by the snapshot, the egress management circuitry is arranged to cause the special slot management circuitry to set the flag for the sub-class of blockable traffic associated with the component type of the associated component, and to only allow the special slot management circuitry to clear that flag once each item of traffic identified by the snapshot has been received.

12. An apparatus as claimed in claim 1, wherein:
the ring interconnect is arranged to be coupled to additional interconnect circuitry via at least one master port component connected to a node of the ring interconnect;
each master port component is a blockable component, and is able to cause the deadlock condition due to a dependency imposed by the additional interconnect circuitry between items of traffic received by the additional interconnect circuitry from the master port component and items of traffic passed to the master port component by the additional interconnect circuitry for transferring via the ring interconnect.

13. An apparatus as claimed in claim 1, further comprising:
a further ring interconnect provided with a plurality of further nodes to connect to associated components, and arranged to transport a plurality of slots around the further ring interconnect between the further nodes in order to transfer items of traffic allocated into those slots between components connected to the further nodes; and
cross-ring coupling circuitry to couple the ring interconnect with the further ring interconnect to allow items of traffic to be passed between the ring interconnect and the further ring interconnect in each direction;

wherein the cross-ring coupling circuitry comprises a first queue structure to buffer items of traffic being passed from the ring interconnect to the further ring interconnect, and a second queue structure to buffer items of traffic being passed from the further ring interconnect to the ring interconnect, each of the first and second queue structures being connected to nodes on both the ring interconnect and the further ring interconnect, and each of the first and second queue structures forming at least one blockable component, the deadlock condition arising when corresponding blockable components in each of the first and second queue structures are full of blockable traffic and the slots on both the ring interconnect and the further ring interconnect are full of blockable traffic destined for those blockable components.

14. An apparatus as claimed in claim 13, wherein:
the further ring interconnect is also arranged in the default mode to allow all of the slots to be available for transfer of any items of traffic; and
the special slot management circuitry is further arranged, in response to the deadlock alert trigger being detected for a blockable component forming a destination for traffic being transferred via the further ring interconnect, to cause a slot amongst the plurality of slots transported around the further ring interconnect to be reserved as a further special slot that is constrained for use only when one or more determined conditions are met.

15. An apparatus as claimed in claim 13, wherein:
the ring interconnect is arranged to be coupled to additional interconnect circuitry via at last one master port component connected to a node of the ring interconnect;
each master port component is also a blockable component, and is able to cause the deadlock condition due to a dependency imposed by the additional interconnect circuitry between items of traffic received by the additional interconnect circuitry from the master port component and items of traffic passed to the master port component by the additional interconnect circuitry for transferring via the ring interconnect;
the blockable traffic comprises a plurality of sub-classes of blockable traffic, comprising same ring master port traffic destined for a master port component on the same ring as that traffic, cross-ring master port traffic destined for a master port component on a different ring to the ring containing that traffic, and cross-ring other traffic destined for a component other than a master port component on a different ring to the ring containing that traffic; and
each of the first and second queue structures is arranged to operate, from a viewpoint of both the ring interconnect and the further ring interconnect, as two blockable components to independently handle the transfer of cross-ring master port traffic and cross-ring other traffic.

16. An apparatus as claimed in claim 1, wherein once the potential for occurrence of the throughput inhibiting condition is determined no longer to be present, the ring interconnect is arranged to return to operation in the default mode.

17. An apparatus comprising:
a ring interconnect;
a plurality of nodes provided within the ring interconnect to connect to associated components;
wherein:
the ring interconnect is arranged to transport a plurality of slots around the ring interconnect between the nodes in order to transfer items of traffic allocated into those slots between components connected to the nodes, wherein for each item of traffic one of the components acts as a source to allocate that item of traffic into one of the slots via the source's associated node, and another component acts as a destination to seek to remove that item of traffic from the ring interconnect when the slot allocated for that item of traffic is received at the destination's associated node;
the ring interconnect is arranged in a default mode to allow all of the slots to be available for transfer of any items of traffic; the apparatus further comprises special slot management circuitry that is responsive to a throughput alert trigger indicating a potential for occurrence of a throughput inhibiting condition, to cause a slot amongst the plurality of slots to be reserved as a special slot that is constrained for use when one or more determined conditions are met, wherein the one or more determined conditions are arranged to cause the special slot to be used in a manner that seeks to avoid the throughput inhibiting condition arising;
the throughput inhibiting condition comprises an ingress denial of service condition;
the special slot management circuitry comprises ingress management circuitry provided in association with each node to manage ingress of items of traffic onto the ring interconnect from an associated component;
the ingress management circuitry is responsive to detecting a potential ingress denial of service condition for the associated component, to seek to obtain a right to allocate an item of traffic from the associated component into the special slot;
the ring interconnect is arranged to transport the special slot around the ring interconnect with associated metadata, the associated metadata comprising an ingress ticket, and the ingress management circuitry is arranged to cause an item of traffic from the associated component to be allocated into the special slot once the ingress management circuitry has acquired the ingress ticket, the ingress management circuitry being able to acquire the ingress ticket when the ingress ticket is indicated as currently unacquired;
the ring interconnect is arranged to transfer items of traffic of multiple traffic classes between the components connected to its nodes, the multiple traffic classes comprising at least blockable traffic and non-blockable traffic; and
the metadata comprises at least one upgrade ticket, and when the ingress management circuitry wishes to insert an item of blockable traffic into the special slot, the ingress management circuitry is required to acquire one of the at least one upgrade tickets to allow the item of blockable traffic to be treated as unblockable before then acquiring the ingress ticket.

18. An apparatus as claimed in claim 17, wherein the ingress management circuitry is arranged, once the upgrade ticket has been acquired, to wait for any current item of traffic in the special slot to be removed from the special slot before acquiring the ingress ticket.

19. An apparatus as claimed in claim 17, wherein:
the blockable traffic comprises a plurality of sub-classes of blockable traffic;
the metadata comprises an upgrade ticket for each sub-class of blockable traffic, and the ingress management circuitry is required to acquire the upgrade ticket applicable for the item of blockable traffic seeking to be allocated into the special slot before then acquiring the ingress ticket.

20. An apparatus as claimed in claim 19, wherein:
the associated metadata comprising a flag for each sub-class of blockable traffic;
the special slot management circuitry is arranged, in response to a deadlock alert trigger being raised for a sub-class of blockable traffic, to set the flag for that sub-class of blockable traffic so as to prevent the special slot from being used for items of traffic of that sub-class of blockable traffic; and
the ingress management circuitry is arranged, when the upgrade ticket applicable for the item of blockable traffic seeking to be allocated into the special slot has been acquired, to ensure that the flag for the sub-class of blockable traffic to which that item of blockable traffic belongs is clear before acquiring the ingress ticket.

21. An apparatus as claimed in claim 17, wherein the ingress management circuitry is arranged to release the ingress ticket on detecting that the item of traffic that was inserted into the special slot, due to the ingress management circuitry having acquired the ingress ticket, has been removed from the special slot.

22. An apparatus as claimed in claim 17, wherein the ingress management circuitry is arranged to release both the upgrade ticket and the ingress ticket on detecting that the item of traffic that was inserted into the special slot, due to the ingress management circuitry having acquired the ingress ticket, has been removed from the special slot.

23. A method of operating a ring interconnect, comprising:
providing a plurality of nodes within the ring interconnect to connect to associated components;
transporting a plurality of slots around the ring interconnect between the nodes in order to transfer items of traffic allocated into those slots between components connected to the nodes, wherein for each item of traffic one of the components acts as a source to allocate that item of traffic into one of the slots via the source's associated node, and another component acts as a destination to seek to remove that item of traffic from the ring interconnect in response to when the slot allocated for that item of traffic being is received at the destination's associated node;
operating the ring interconnect, when in a default mode, to allow all of the slots to be available for transfer of any items of traffic; and
in response to a throughput alert trigger indicating a potential for occurrence of a throughput inhibiting condition, causing a slot amongst the plurality of slots to be reserved as a special slot that is constrained for use in response to detecting that only when one or more determined conditions are met, wherein the one or more determined conditions are arranged to cause the special slot to be used in a manner that seeks to avoid the throughput inhibiting condition arising,
wherein:
the throughput inhibiting condition comprises a deadlock condition;
the method comprises transferring items of traffic of multiple traffic classes between the components connected to the nodes, the multiple traffic classes comprising at least blockable traffic and non-blockable traffic;
wherein the blockable traffic is traffic whose destination is a blockable component that is able to cause the deadlock condition by virtue of being able to enter a state where that blockable component is unable to accept from the ring interconnect any item of traffic in a situation where each of the slots has been allocated an item of traffic for that blockable component;
the throughput alert trigger is a deadlock alert trigger raised in association with a given blockable component to indicate a potential for occurrence of the deadlock condition for that given blockable component; and
the method comprises, in response to the deadlock alert trigger, ensuring that the special slot is reserved for use to transfer items of traffic that are destined for a component other than the given blockable component.

* * * * *